United States Patent
Ichio et al.

(10) Patent No.: US 9,496,637 B2
(45) Date of Patent: Nov. 15, 2016

(54) VEHICLE-SIDE CONNECTOR

(71) Applicant: Sumitomo Wiring Systems, Ltd., Yokkaichi, Mie (JP)

(72) Inventors: Toshifumi Ichio, Mie (JP); Toshiyuki Matsuda, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/777,533

(22) PCT Filed: Mar. 19, 2013

(86) PCT No.: PCT/JP2013/057885
§ 371 (c)(1),
(2) Date: Sep. 16, 2015

(87) PCT Pub. No.: WO2014/147761
PCT Pub. Date: Sep. 25, 2014

(65) Prior Publication Data
US 2016/0072213 A1 Mar. 10, 2016

(51) Int. Cl.
*H01R 13/52* (2006.01)
*H01R 13/436* (2006.01)
(Continued)

(52) U.S. Cl.
CPC ....... *H01R 13/4367* (2013.01); *B60L 11/1818* (2013.01); *H01R 13/5812* (2013.01);
(Continued)

(58) Field of Classification Search
CPC ............ H01R 13/5202; H01R 13/5205; H01R 13/5208; H01R 13/5221; H01R 13/52; H01R 13/4367; B60L 2270/34
(Continued)

(56) References Cited

U.S. PATENT DOCUMENTS 5,751,135 A * 5/1998 Fukushima ......... B60L 11/1818
320/107
5,873,737 A * 2/1999 Hashizawa ......... B60L 11/1818
439/310
(Continued)

FOREIGN PATENT DOCUMENTS

EP 2525443 A1 11/2012
JP 2005-5233 1/2005
(Continued)

OTHER PUBLICATIONS

International Search Report.
European Search Report Dated Jan. 14, 2016.

*Primary Examiner* — Chandrika Prasad
*Assistant Examiner* — Harshad Patel
(74) *Attorney, Agent, or Firm* — Gerald E. Hespos; Michael J. Porco; Matthew T. Hespos

(57) ABSTRACT

A vehicle-side connector (10) to be connected to a charging connector (1) to charge a battery mounted in a vehicle includes a housing (30) provided in the vehicle such that the charging connector (1) is fittable thereinto from front, terminal fittings (11) respectively connected to a plurality of wires (20P, 20S) drawn out from the interior of the vehicle including the battery, a plurality of terminal accommodating chambers (40) provided in the housing (30) and configured such that the respective terminal fittings (11) are accommodated thereinto by being inserted from behind, and a retainer (50) assemblable with a rear surface of the housing (30) to lock and retain each terminal fitting (11). A wire holding portion (65) capable of bundling and holding the respective wires (20P, 20S) arranged on a rear surface side of the retainer (50) by a tying member (T) is formed to project from the retainer (50).

1 Claim, 21 Drawing Sheets

(51) Int. Cl.
*B60L 11/18* (2006.01)
*H01R 13/58* (2006.01)
*H01R 13/506* (2006.01)
*H01R 24/66* (2011.01)
*H01R 24/86* (2011.01)

(52) U.S. Cl.
CPC .......... *B60L 2240/36* (2013.01); *H01R 13/506* (2013.01); *H01R 24/66* (2013.01); *H01R 24/86* (2013.01); *H01R 2201/26* (2013.01); *Y02T 10/7005* (2013.01); *Y02T 10/7072* (2013.01); *Y02T 90/14* (2013.01)

(58) Field of Classification Search
USPC ......... 439/34, 345, 752, 595, 460, 272, 464, 439/470, 449, 452, 638
See application file for complete search history.

(56) References Cited

U.S. PATENT DOCUMENTS

| | | | | |
|---|---|---|---|---|
| 6,123,569 | A * | 9/2000 | Fukushima | B60L 11/1818 439/310 |
| 6,152,752 | A * | 11/2000 | Fukuda | H01R 13/5208 439/274 |
| 6,302,734 | B1 * | 10/2001 | Ichio | H01R 13/5208 439/274 |
| 6,443,765 | B2 * | 9/2002 | Ichio | H01R 13/52 439/274 |
| 6,443,766 | B2 * | 9/2002 | Ichio | H01R 13/52 439/274 |
| 6,821,160 | B2 * | 11/2004 | Fink | H01R 13/512 439/595 |
| 7,070,454 | B1 * | 7/2006 | Pepe | H01R 31/005 439/464 |
| 7,597,580 | B1 * | 10/2009 | Advey | H01R 13/502 439/272 |
| 8,425,256 | B2 * | 4/2013 | Aoki | H01R 13/688 439/620.26 |
| 2003/0054690 | A1 * | 3/2003 | Fukatsu | H01R 43/16 439/595 |
| 2003/0096539 | A1 * | 5/2003 | Ichio | H01R 13/4362 439/752 |
| 2009/0137153 | A1 | 5/2009 | Yoshioka | |
| 2009/0215300 | A1 | 8/2009 | Shiga | |
| 2010/0151721 | A1 | 6/2010 | Tyler | |
| 2011/0287667 | A1 | 11/2011 | Ichio | |
| 2012/0295460 | A1 | 11/2012 | Ichio | |
| 2013/0017713 | A1 | 1/2013 | Asakuma et al. | |

FOREIGN PATENT DOCUMENTS

| | | |
|---|---|---|
| JP | 2011-249039 | 12/2011 |
| JP | 2012-511804 | 5/2012 |
| JP | 2013-20807 | 1/2013 |
| WO | 2012175573 A1 | 12/2012 |

* cited by examiner

VEHICLE-SIDE CONNECTOR

BACKGROUND

1. Field of the Invention

The present invention relates to a vehicle-side connector to be connected to a charging connector during charging.

2. Description of the Related Art

Conventionally, a vehicle-side connector of this type is known from Japanese Unexamined Patent Publication No. 2011-249039. This vehicle-side connector is structured such that a plurality of terminal accommodating chambers are formed in alignment in a housing to be mounted to face a power supply port open on a body and terminal fittings connected to ends of wires drawn out from a battery device side are inserted into the corresponding terminal accommodating chambers from behind and retained by mounting a retainer on the rear surface of the housing. A battery is charged by connecting a charging connector connected to a power supply to the vehicle-side connector.

In the above conventional vehicle-side connector, the wires drawn out to the rear surface side of the vehicle-side connector may be possibly pulled in a direction oblique to a proper draw-out direction and, because of that, the terminal fittings may be obliquely accommodated in the terminal accommodating chambers. Then, when the mating charging connector is connected, corresponding terminals cannot be connected to each other since axes thereof are not aligned. Even if this does not occur, connection resistance tends to be large. Thus, an improvement has been desired.

The present invention was completed based on the above situation and aims to enable terminal fittings to be accommodated in a proper posture into terminal accommodating chambers.

SUMMARY OF THE INVENTION

The present invention is directed to a vehicle-side connector to be connected to a charging connector to charge a battery mounted in a vehicle, including a housing provided in the vehicle such that the charging connector is fittable thereinto from front, terminal fittings respectively connected to a plurality of wires drawn out from the interior of the vehicle including the battery, a plurality of terminal accommodating chambers provided in the housing and configured such that the respective terminal fittings are accommodated thereinto by being inserted from behind, and a retainer assemblable with a rear surface of the housing to lock and retain each terminal fitting, wherein a wire holding portion capable of bundling and holding the respective wires arranged on a rear surface side of the retainer by a tying member is formed to project from the retainer.

The respective wires drawn out to the rear surface side of the retainer are arranged along the wire holding portion formed to project from the retainer and bundled and held in the wire holding portion via the tying member such as a tape wound around the wires. Thus, even if the wires are pulled in an oblique direction, the end parts of the wires immediately after the terminal fittings are prevented from being bent and the terminal fittings are kept accommodated in a proper posture in the terminal accommodating chambers. As a result, the vehicle-side connector can be smoothly connected to the mating charging connector.

Each wire may be drawn out in a direction substantially perpendicular to an axis of the terminal accommodating chamber on the rear surface side of the housing, and the wire holding portion is formed to project in a radial direction substantially perpendicular to the axes of the terminal accommodating chambers from the retainer. This is conveniently applied to a vehicle-side connector of a type in which wires are drawn out in a direction substantially perpendicular to axial directions of terminal accommodating chambers.

Each wire may be drawn out along an axial direction of the terminal accommodating chamber on the rear surface side of the housing, and the wire holding portion is formed to project backward to extend along axes of the terminal accommodating chambers from the retainer. This is conveniently applied to a vehicle-side connector of a type in which wires are drawn out backward along the axes of terminal accommodating chambers.

The terminal fittings may be round pin terminals, whereas the retainer is formed with locking grooves into which the terminal fittings are radially insertable and which lock and axially retain locked portions provided on the terminal fittings, and a movement regulating portion narrower than a diameter of the terminal fitting is formed on a back end side of each locking groove.

The terminal fitting is radially inserted into the corresponding locking groove of the retainer, a movement thereof along the locking groove is regulated when the terminal fitting is pushed to the back end beyond the movement regulating portion, and the terminal fitting is retained in the terminal accommodating chamber by locking the locked portion to side edge parts of the locking groove in such a state.

By regulating the movement of the terminal fitting along the locking groove, the inclination of the terminal fitting in the terminal accommodating chamber is more reliably prevented. That the terminal fitting has been pushed to a proper position in the locking groove can be confirmed by a feeling of moderation when the terminal fitting moves beyond the movement regulating portion.

According to the vehicle-side connector of the present invention, the terminal fittings can be accommodated in a proper posture into the terminal accommodating chambers and, consequently, a connecting operation to the mating charging connector can be smoothly performed.

DETAILED DESCRIPTION

A first embodiment of the present invention is described with reference to FIGS. 1 to 11. In this embodiment, a vehicle-side connector 10 to be connected to a mating charging connector 1 to charge a battery mounted in a plug-in hybrid vehicle is illustrated. The vehicle-side connector 10 of this embodiment is of a so-called 90° type in which wires drawn out to the rear surface are arranged by being bent substantially at a right angle.

Figure 1:
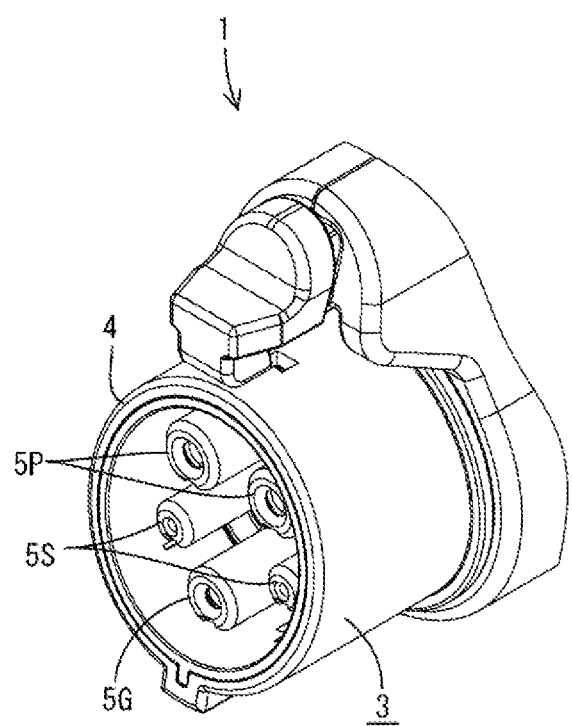
FIG. 1 is a perspective view of a mating charging connector according to a first embodiment of the present invention.

First, the mating charging connector 1 is briefly described. As shown in FIG. 1, the charging connector 1 includes a female housing 3 to be connected to a male housing 30 of the vehicle-side connector 10. This female housing 3 is structured such that five terminal accommodating tubes 5 independent of each other project from a back wall in a small receptacle 4. Female power terminals are accommodated in two terminal accommodating tubes 5P in an upper row, a female ground terminal is accommodated in the terminal accommodating tube 5G in the center of a lower row and female signal terminals are accommodated in the terminal accommodating tubes 5S on opposite ends of the lower row.

Figure 2:
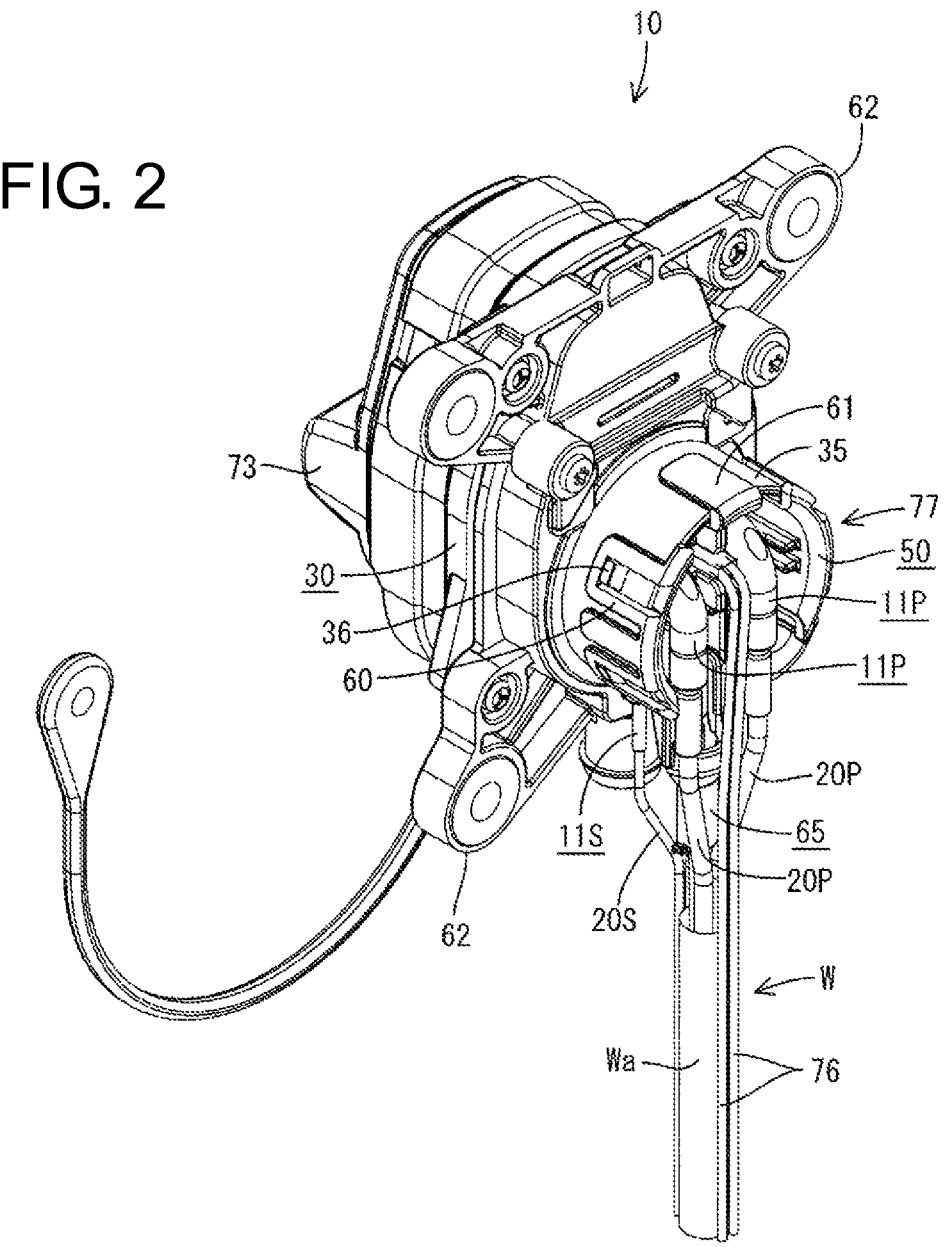
FIG. 2 is a perspective view viewed from behind showing a vehicle-side connector in a state where a grommet is removed.
Figure 3:
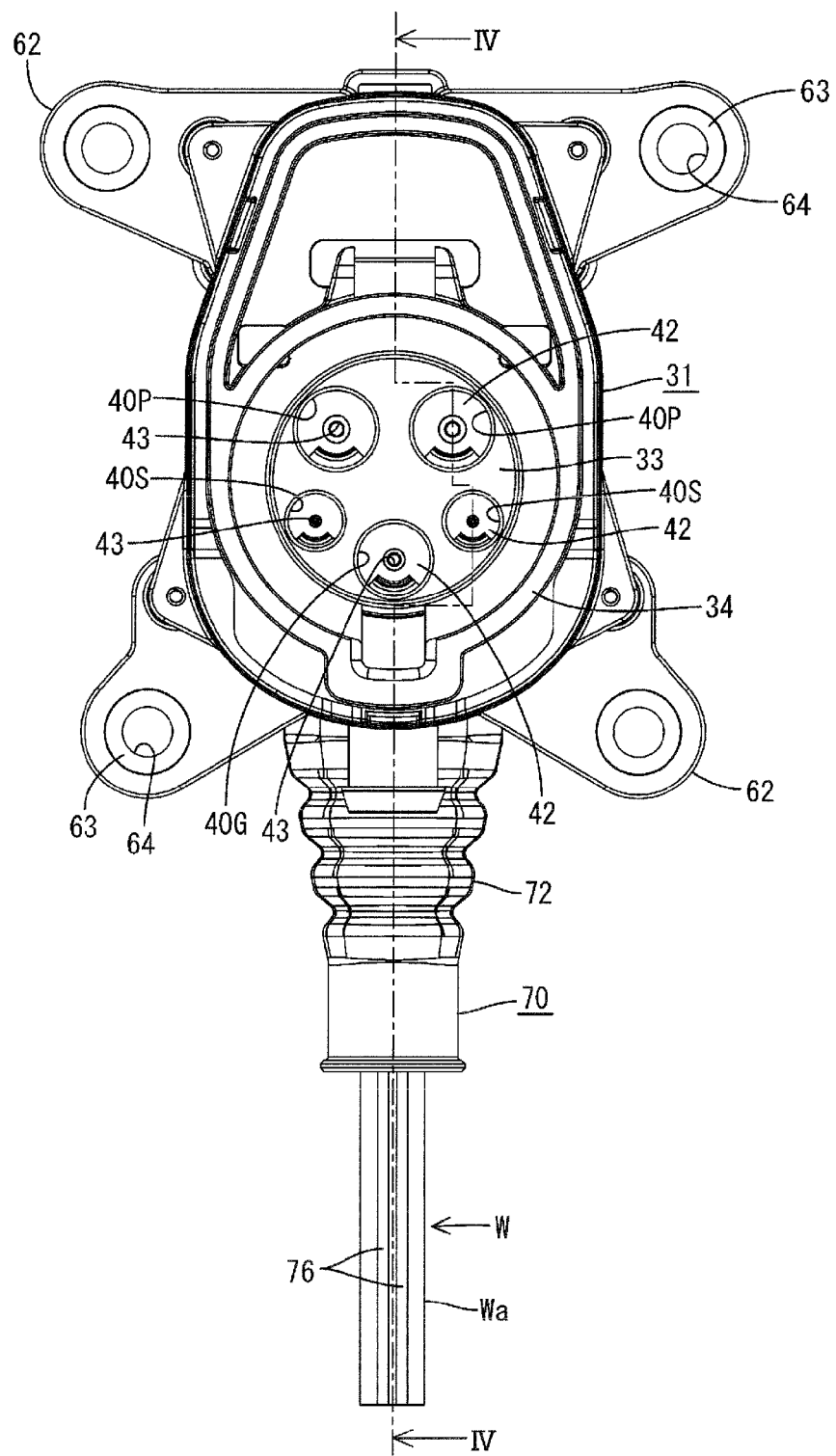
FIG. 3 is a rear view of the vehicle-side connector.
Figure 4:
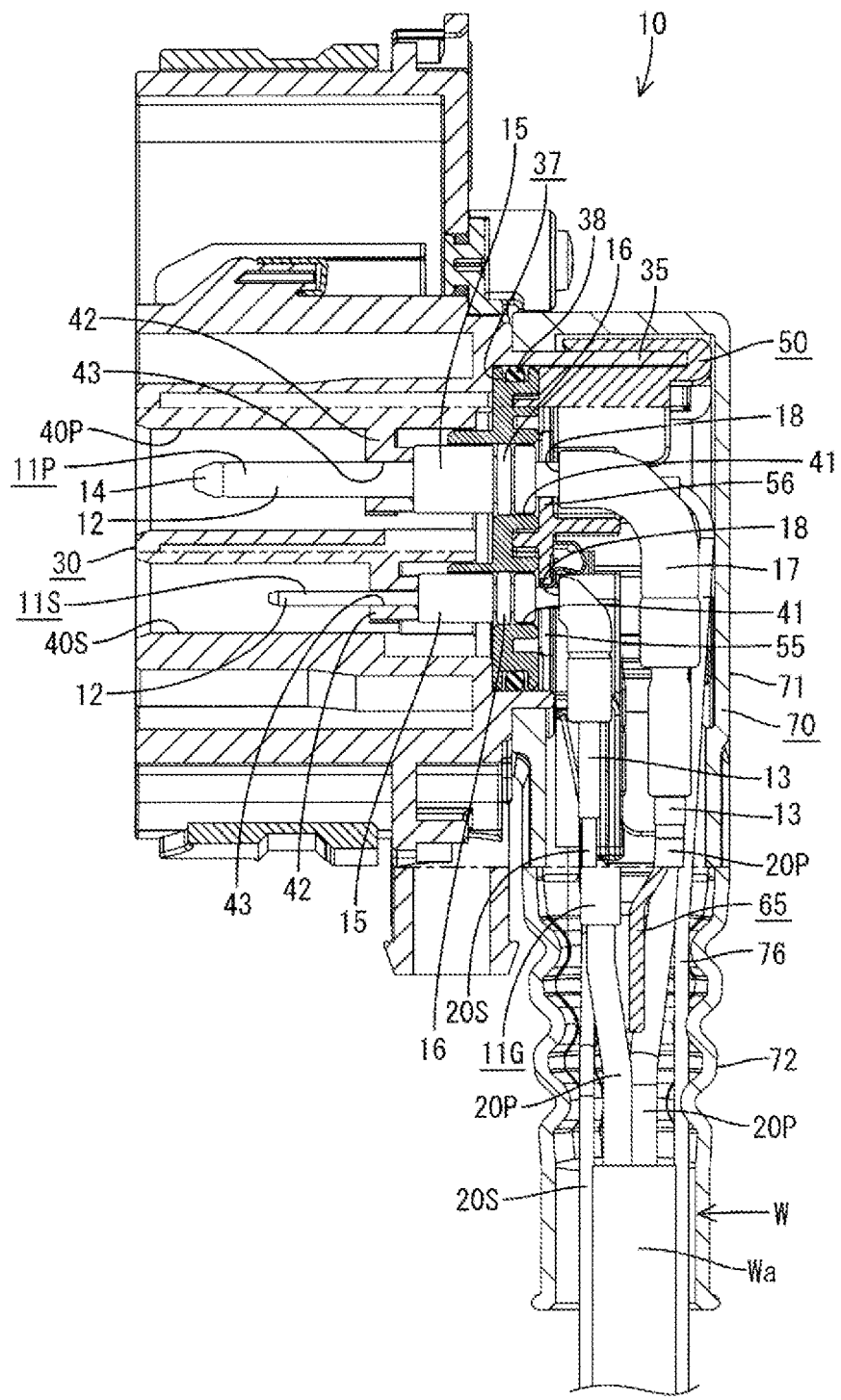
FIG. 4 is a section along VI-VI of FIG. 3.

As shown in FIGS. 2 to 4, the vehicle-side connector 10 includes five vehicle-side terminals 11, the male housing 30, a retainer 50 and the like. This vehicle-side connector 10 is so fixed to a body or the like of the vehicle to face a power supply port provided on the body or the like, and the female housing 3 of the above charging connector 1 is connectable to the male housing from front.

The vehicle-side terminals 11 are composed of two male power terminals 11P, one male ground terminal 11G and two male signal terminals 11S. In the following description, the five vehicle-side terminals are referred to as "vehicle-side terminals 11" when being commonly described while being distinguished as the power terminals 11P, the ground terminal 11G and the signal terminals 11S when being individually described. Each vehicle-side terminal 11 is basically formed of a round pin terminal bent into an L shape.

As shown in FIG. 4, the power terminal 11P is formed with a terminal connecting portion 12 to be connected to the mating power terminal on one end side and a tubular wire connecting portion 13 to be crimped to a core of a wire 20 on the other end side. A protection cap 14 is fitted on the tip surface of the terminal connecting portion 12, a fitting portion 15 enlarged in diameter is formed over a predetermined length on a base end side of the terminal connecting portion 12 and a seal ring 16 is fitted on the outer periphery of a rear end side of the fitting portion 15. Further, an insulating tube portion 17 made of synthetic resin is formed on a bent part by molding, and a locked groove 18 into which a locking portion 56 of the retainer 50 to be described later is fitted is formed between one end surface of this insulating tube portion 17 and the rear surface of the fitting portion 15. The power terminal 11P is connected to an end of a large-diameter wire 20P (thick wire 20P).

The ground terminal 11G and the signal terminal 11S are described. Note that parts and members of the both terminals 11G, 11S having the same function as the power terminal 11P described above are denoted by the same reference signs and repeated description is simplified or omitted.

The ground terminal 11G (see FIGS. 6 and 7) is shaped similarly to the power terminal 11P and likewise connected to an end of a thick wire 20P.

Note that three thick wires 20P are bundled into one as an integrated shielded wire Wa (cab tire cable).

The signal terminal 11S differs from the power terminal 11P in that it is thinner in diameter as a whole, a terminal connecting portion 12 is short and no protection cap is mounted as shown in FIG. 4. An end of a small-diameter wire 20S (thin wire 20S) is connected to this signal terminal 11S by crimping a wire connecting portion 13.

The male housing 30 is made of synthetic resin and composed of two pieces, i.e. a housing main body 31 and a sub-housing 37 as shown in FIG. 4. As shown in FIG. 3, the housing main body 31 is such that a cylindrical terminal accommodating portion 33 is formed to project on the front surface of a substantially rectangular base plate 32 (see FIG. 5) and a large receptacle 34 into which the small receptacle 4 of the female housing 3 in the charging connector 1 described above is to be fitted is formed around the terminal accommodating portion 33.

Figure 5:
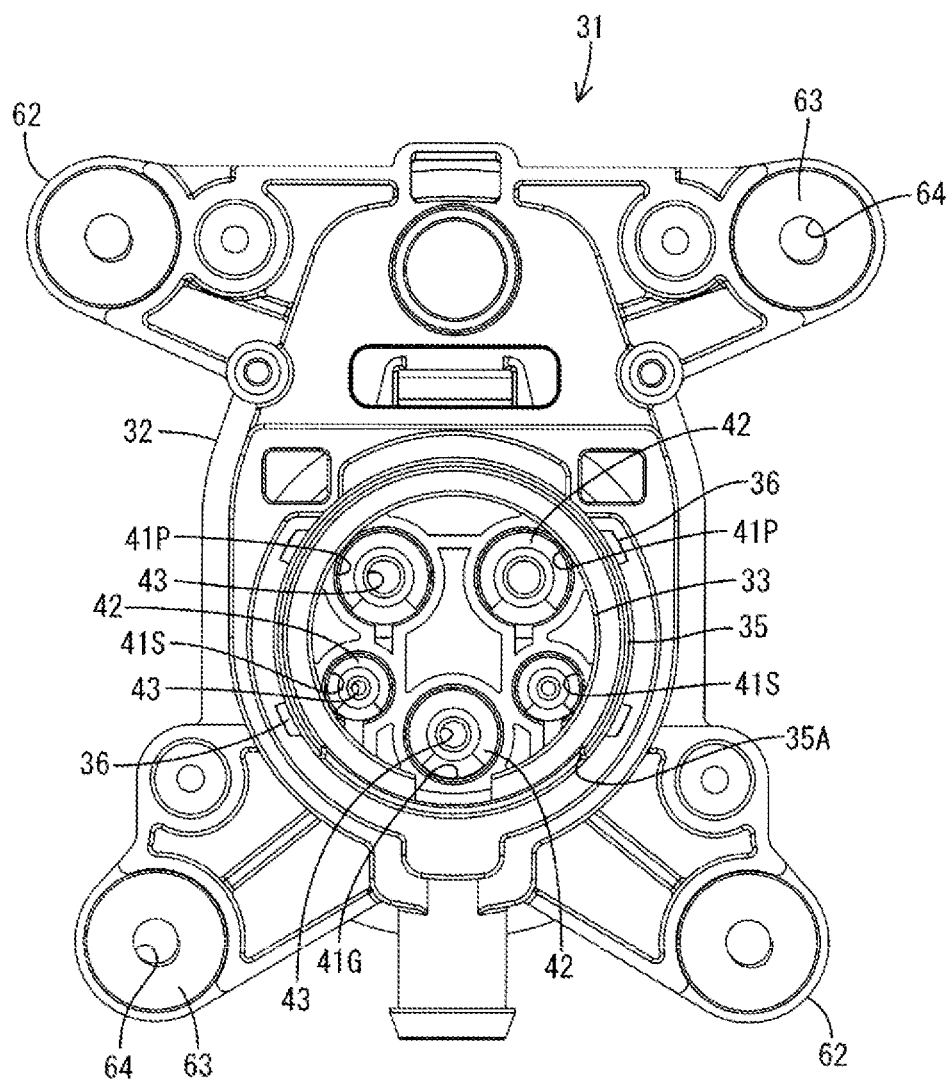
FIG. 5 is a rear view of a housing main body.

A fitting tube portion 35 is formed around the rear surface of the terminal accommodating portion 33 on a back surface side of the base plate 32, and a rear end side of the lower surface of this fitting tube portion 35 is cut to form an escaping recess 35A as shown in FIG. 5. As shown in FIG. 4, the disc-like sub-housing 33 is fitted into the fitting tube portion 35 in a water-tight manner via a seal ring 38 fitted on a peripheral surface.

From the terminal accommodating portion 33 of the housing main body 31 to the sub-housing 37 arranged on the rear surface side of the terminal accommodating portion 33, five terminal accommodating chambers 40 open forward and backward are formed in such an arrangement that the terminal accommodating tubes 5 of the mating charging connector 1 are fittable with the front surfaces in the lead. Thus, as shown in FIG. 3, the male power terminals 11P, the male ground terminal 11G and the male signal terminals 11S are respectively accommodated into two terminal accommodating chambers 40P in an upper row, the terminal accommodating chamber 40G in the center of a lower row and the terminal accommodating chambers 40S on opposite ends of the lower row from behind.

As shown in FIG. 4, each terminal accommodating chamber 40P, 40G, 40S has such a diameter that the fitting portion 15 of the substantially corresponding vehicle-side terminal 11 (power terminal 11P, ground terminal 11G, signal terminal 11S) is fittable. Further, a stopper wall 42 with which the front surface of the fitting portion 15 of the corresponding vehicle-side terminal 11 is brought into contact is formed at a lengthwise intermediate position of the terminal accommodating chamber 40 and an insertion hole 43 allowing the terminal connecting portion 12 of the corresponding vehicle-side terminal 11 to be inserted therethrough is open on each stopper wall 42.

Thus, the terminal connecting portion 12 of each vehicle-side terminal 11 (11P, 11G, 11S) is inserted into the corresponding terminal accommodating chamber 40 (40P, 40G, 40S) and pushed while passing through the insertion hole 43 halfway through, and the pushing is stopped when the front surface of the fitting portion 15 comes into contact with the stopper wall 42. At this time, the terminal connecting portion 12 of each vehicle-side terminal 11 projects forwardly of the stopper wall 42 and the seal ring 16 fitted on the fitting portion 15 is tightly fitted into an entrance 41P, 41G, 41S of each terminal accommodating chamber 40P, 40G, 40S. Further, as shown in FIG. 4, the locked groove 18 of each vehicle-side terminal 11 is arranged at a position behind the rear surface of the sub-housing 37.

The retainer 50 is provided to hold the corresponding vehicle-side terminal 11 in a state retained in each terminal accommodating chamber 40. This retainer 50 is made of synthetic resin and includes, as shown in FIGS. 8 to 11, a hollow cylindrical retainer main body 51 with a front surface plate 52, and this retainer main body 51 is fittable to the rear surface side of the sub-housing 37 in the fitting tube portion 35 provided in the housing main body 31. The lower surface of a peripheral wall 53 of the retainer main body 51 is cut in a range of substantially one-quarter circumference to form an escaping recess 53A.

Five vertical locking grooves 55 into which the locked grooves 18 formed on the respective vehicle-side terminals 11 are radially insertable are so formed on the front surface plate 52 of the retainer main body 51 as to be open on the peripheral edge of the front surface plate 52. The back ends of the respective locking grooves 55 are respectively concentrically arranged with the five terminal accommodating chambers 40.

The locked grooves 18 of the power terminals 11P are tightly insertable into two locking grooves 55P open on the upper edge out of the five locking grooves 55. Note that escaping grooves extending backward from the upper edges of the respective locking grooves 55P are formed on the upper surface of the peripheral wall 53 of the retainer main body 51. The locked groove 18 of the power terminal 11P is tightly fitted into a lower end part of each locking groove 55P. Thus, the peripheral edge (lower edge and opposite side edges) of the lower end part of the locking groove 55P serves as a locking portion 56 to be locked to side surfaces of the locked groove 18. Further, a pair of regulating projections 58 are formed on opposite side edges of the locking groove 55P near the lower end while facing each other at a distance shorter than a groove width of the locking groove 55.

The locked groove 18 of the ground terminal 11G is tightly insertable into the central locking groove 55G out of three locking grooves 55 open on the lower edge. The locked groove 18 of the ground terminal 11G is tightly fitted into an upper end part of this locking groove 55G. Thus, the peripheral edge (upper edge and opposite side edges) of the upper end part of the locking groove 55G serves as a locking portion 56 to be locked to groove surfaces of the locked groove 18.

The locked grooves 18 of the signal terminals 11S are tightly insertable into two locking grooves 55G on opposite ends. The locked groove 18 of the signal terminal 11G is tightly fitted into an upper end part of each locking groove 55S. Thus, the peripheral edge (upper edge and opposite side edges) of the upper end part of the locking groove 55S serves as a locking portion 56 to be locked to groove surfaces of the locked groove 18.

A pair of regulating projections 58 are formed on opposite side edges of each locking groove 55G, 55S near the upper end while facing each other at a distance shorter than a groove width of each locking groove 55G, 55S.

Two pairs of left and right lock frames 60 which can slide in contact with the outer peripheral surface of the above fitting tube portion 35 are resiliently displaceably provided on an outer peripheral part of the peripheral wall 53 of the retainer main body 51 while being folded forward from the rear edge of the peripheral wall 53. Note that clamping plates 61 capable of clamping the fitting tube portion 35 in cooperation with the peripheral wall 53 are formed between the lock frames 60 likewise while being folded forward from the rear edge of the peripheral wall 53.

On the other hand, as shown in FIG. 5, lock protrusions 36 are formed at four positions corresponding to the respective lock frames 60 on the outer peripheral surface of the fitting tube portion 35.

The retainer 50 is pushed from behind while the fitting tube portion 35 is inserted between the peripheral wall 53 of the retainer main body 51 and the lock frames 60 and the clamping plate 61, and the lock frames 60 move onto the corresponding lock protrusions 36 halfway through to be deflected, displaced and pushed. When the retainer 50 is pushed to a proper position where the tip of the fitting tube portion 35 reaches the back ends of the lock frames 60 and the clamping plates 61 as shown in FIG. 4, the lock frames 60 are restored and displaced to be fitted to the lock protrusions 36, whereby the retainer 50 is mounted while being prevented from coming off backward.

Figure 8:
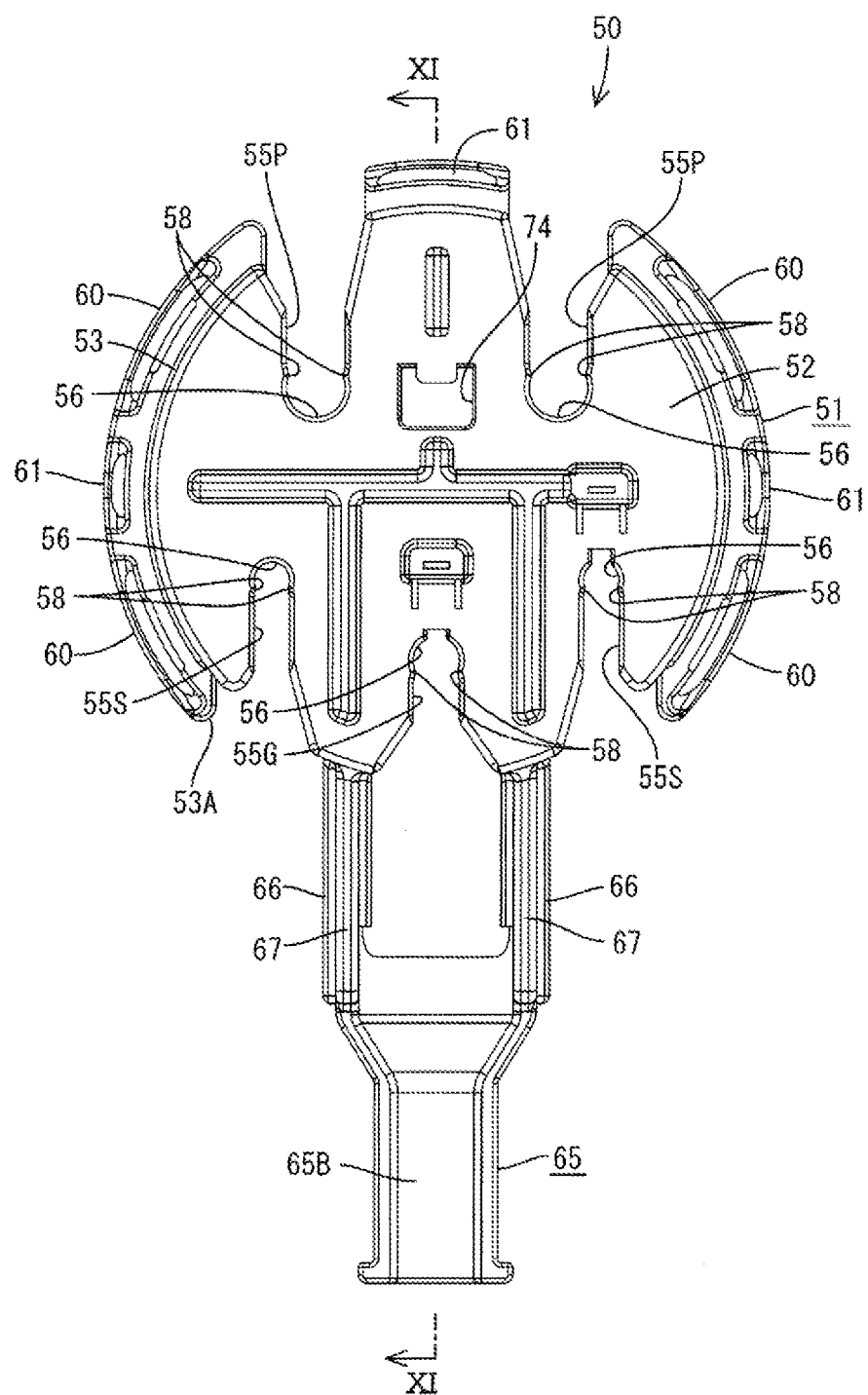
FIG. 8 is a front view of a retainer.
Figure 9:
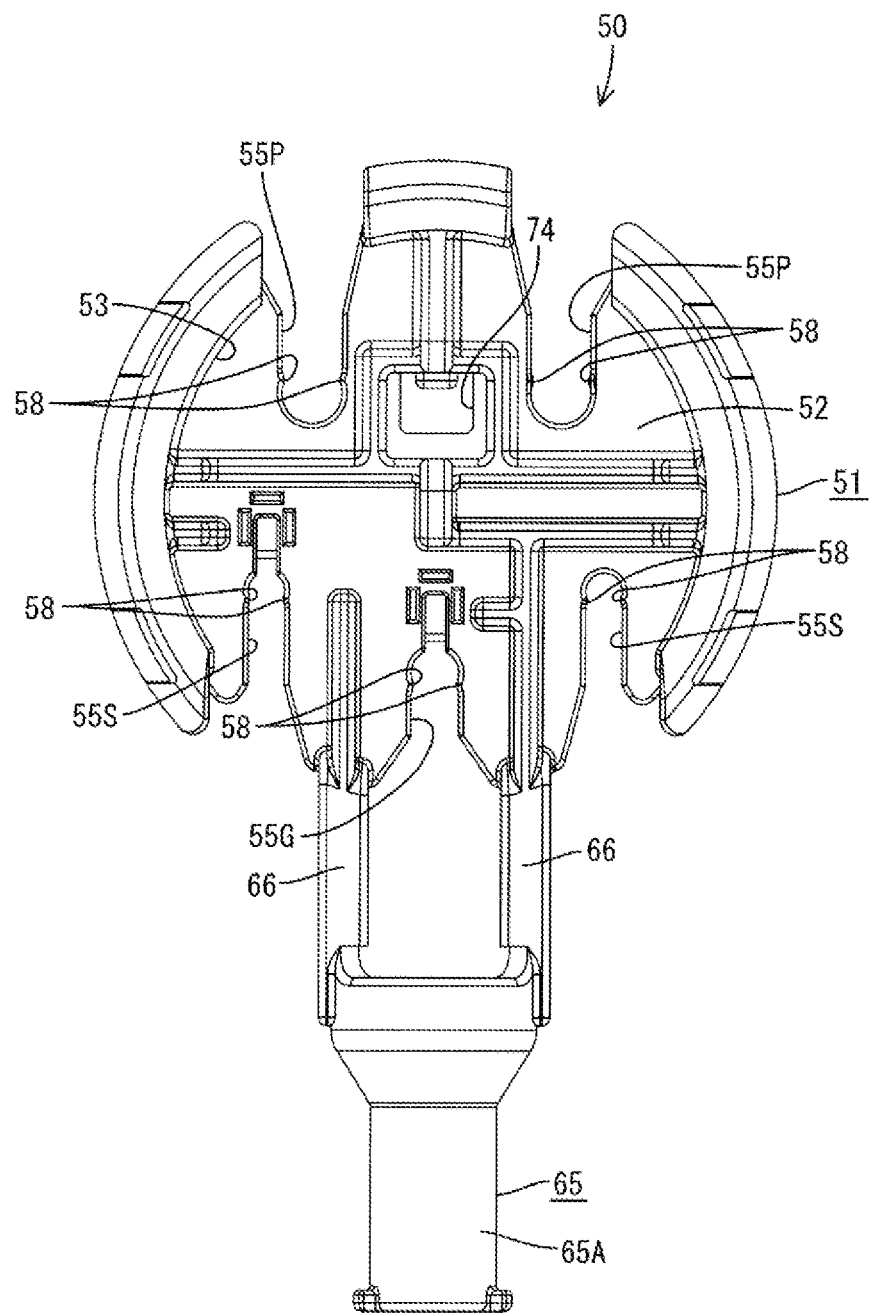
FIG. 9 is a rear view of the retainer.
Figure 10:
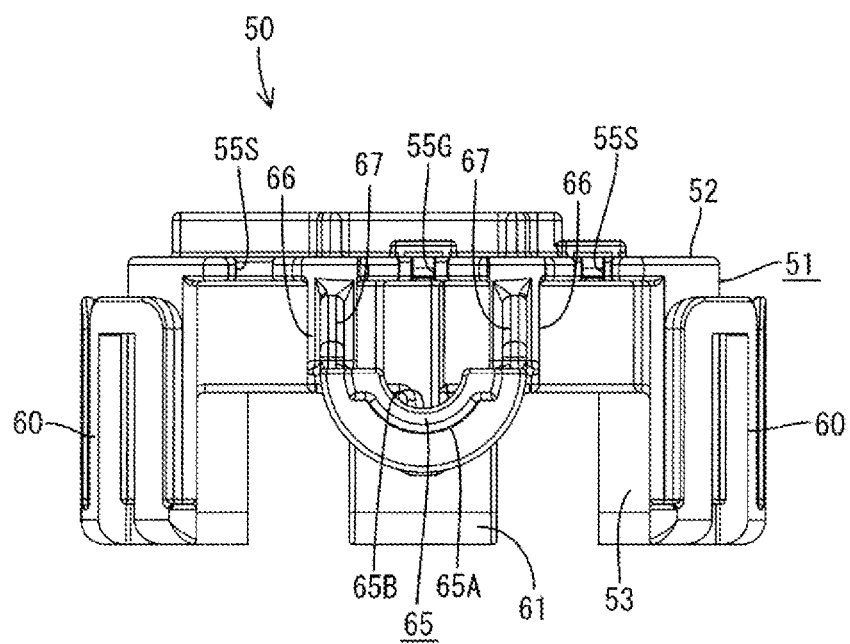
FIG. 10 is a bottom view of the retainer.
Figure 11:
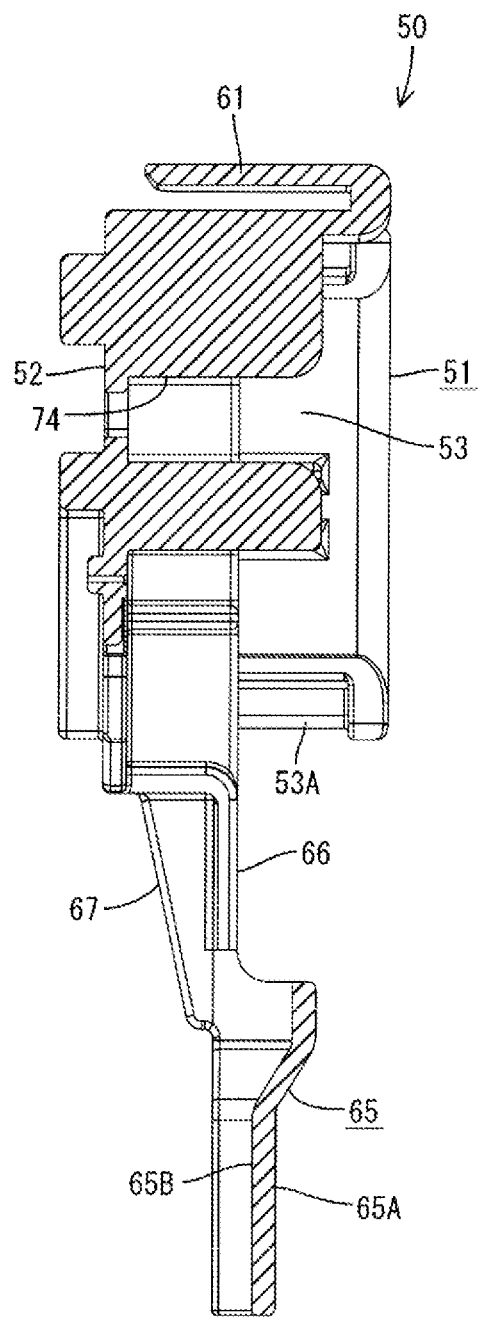
FIG. 11 is a section along XI-XI of FIG. 8.

The retainer 50 is formed with a wire holding portion 65 hanging down from the lower edge of the front surface plate 52 of the retainer main body 51. Specifically, a pair of L-shaped supporting legs 66 bent downwardly after projecting backward hang down at two positions on the lower edge of the front surface plate 52 between the locking groove 55G and the left locking groove 55S and between the locking groove 55G and the right locking groove 55S as shown in FIG. 8, and the stepped and hollow semi-cylindrical wire holding portion 65 whose upper end is expanded in diameter is formed to extend over to the lower ends of the both supporting legs 66 while a bulging convex surface 65A is facing backward (rightward in FIG. 11). Reinforcing plates 67 are formed on the back sides (front surface sides) of the supporting legs 66 to reinforce the supporting legs 66.

In other words, the wire holding portion 65 is provided to hang down from the supporting legs 66 at a position at a predetermined distance from and below the escaping recess 53A in the center of the escaping recess 53A formed on the lower surface of the peripheral wall 53 of the retainer main body 51.

Mounting portions 62 are formed to project outward on four corners of the base plate 32 in the housing main body 31, and each mounting portion 62 is provided with a collar 63 made of metal and formed with a bolt hole 64 by insert molding.

A grommet 70 is mounted on the rear surface side of the male housing 30 and structured such that a bellows-like wire inserting portion 72, through which a wire group W is to be inserted, is connected to the lower end of a cover portion 71 for covering around the retainer 50 from behind.

A front cover 73 is removably mounted on the front surface of the male housing 30.

Next, an example of the procedure of assembling the vehicle-side connector 10 and mounting it on the body is described.

As already described, the wire connecting portion 13 of each vehicle-side terminal 11 is crimped and connected to the end of each wire 20P, 20S and the five vehicle-side terminals 11 connected to the ends of the wires 20P, 20S in this way are mounted into the retainer 50. The locked groove 18 of each vehicle-side terminal 11 is radially inserted into the corresponding locking groove 55. In a final stage of the insertion, the locked groove 18 is passed between the pair of regulating projections 58 and fitted to the back end of the locking groove 55 after passing through the regulating projections 58. In this way, the opposite side surfaces of the locked groove 18 of each vehicle-side terminal 11 are locked to the locking portion 56 (back end of the locking groove 55)

while the detachment of the vehicle-side terminal 11 along the locking groove 55 is regulated by the pair of regulating projections 58, whereby each vehicle-side terminal 11 is mounted with movements thereof in the front-back direction (lateral direction of FIG. 4) regulated.

Figure 6:
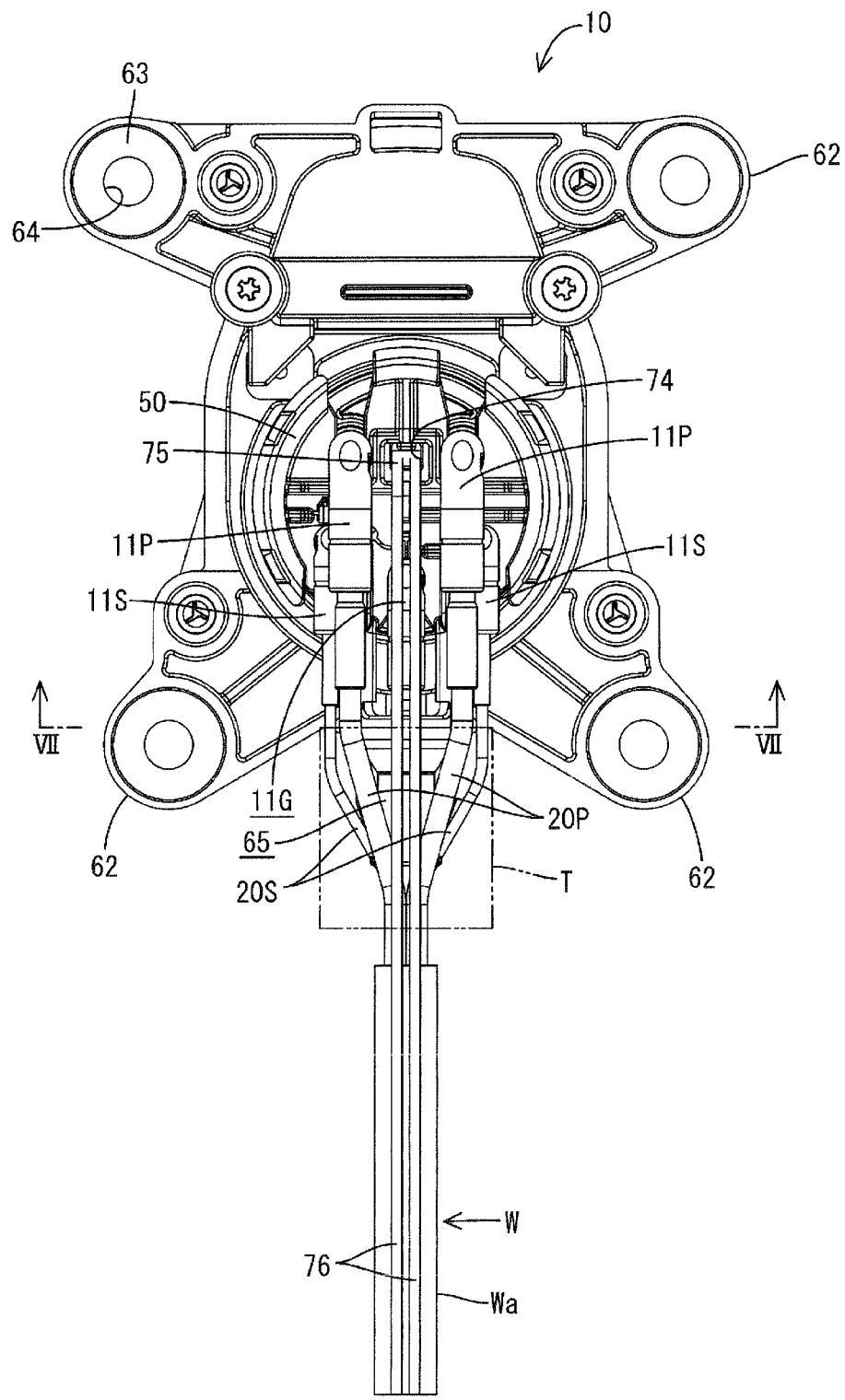
FIG. 6 is a rear view of the vehicle-side connector in the state where the grommet is removed.
Figure 7:
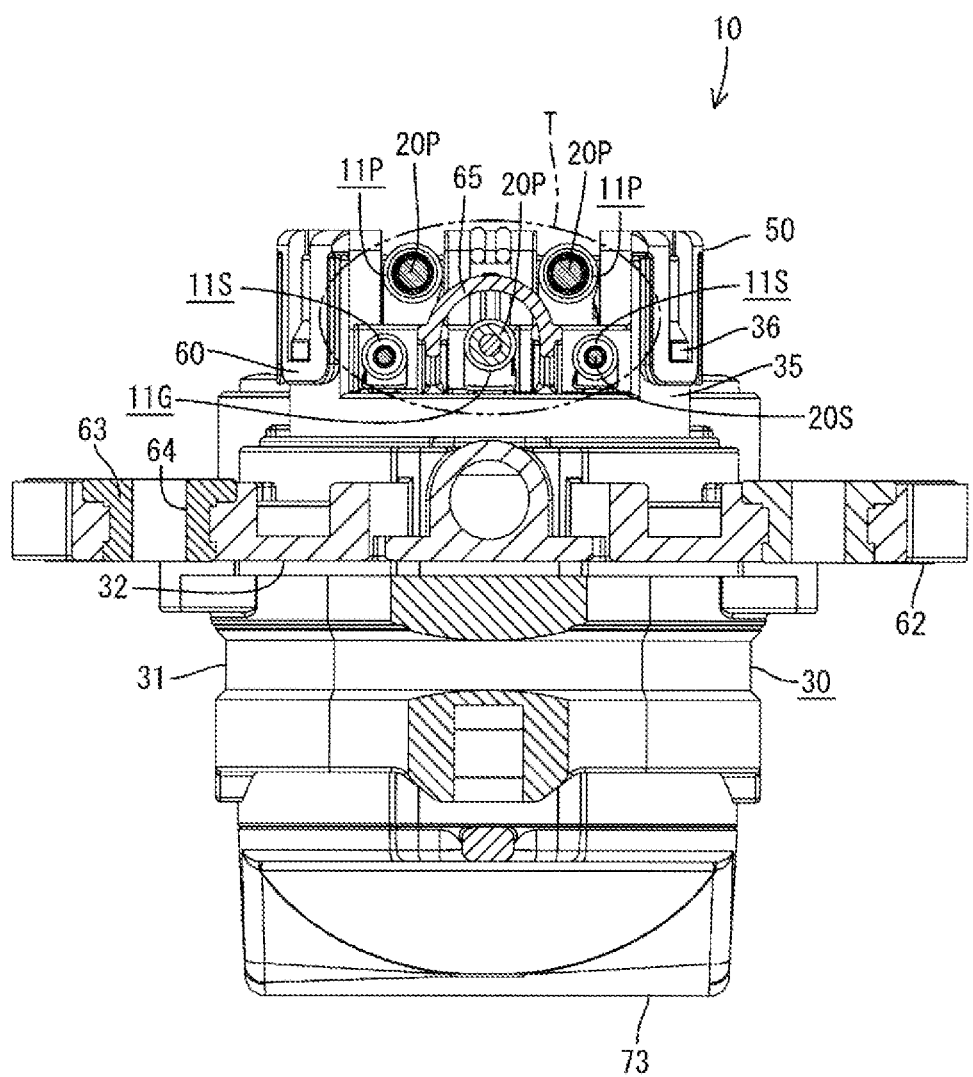
FIG. 7 is a section along VII-VII of FIG. 6.

The wire connecting portion 13 of each vehicle-side terminal 11 projects downward through the escaping recess 53A formed on the lower surface of the peripheral wall 53 of the retainer main body 51 and the wire 20P, 20S connected to each wire connecting portion 13 is arranged along the outer surface of the wire holding portion 65. Specifically, as shown in FIGS. 6 and 7, two thick wires 20P drawn out from the power terminals 11P are arranged at two positions between a width center position and opposite left and right side edges of the convex surface 65A, two thin wires 20S drawn out from the signal terminals 11S are arranged along the opposite left and right side edges of the convex surface 65A and the thick wire 20P drawn out from the ground terminal 11G is arranged at a center width position of a concave surface 65B on the back. These five wires 20P, 20S arranged along the wire holding portion 65 are fixed by winding a tape T on the outer sides of the wires 20P, 20S as schematically shown in chain line in FIGS. 6 and 7.

Subsequently, the terminal connecting portion 12 of each vehicle-side terminal 11 projecting on the front surface of the retainer 50 is inserted into the entrance 41 of the terminal accommodating chamber 40 formed in the sub-housing 37 from behind. When the retainer 50 is inserted until the front surface plate 52 of the retainer main body 51 comes into contact with the rear surface of the sub-housing 37, the seal ring 16 fitted on the fitting portion 15 of each vehicle-side terminal 11 is tightly fitted into the entrance 41 of the corresponding terminal accommodating chamber 40 and the sub-housing 37 and the retainer 50 are integrally assembled (sub-assembly) on the ends of the wires 20P, 20S (vehicle-side terminals 11) by resulting frictional forces.

This sub-assembly 77 is fitted into the fitting tube portion 35 from behind while the terminal connecting portion 12 of each vehicle-side terminal 11 (11P, 11G, 11S) is inserted into the corresponding terminal accommodating chamber 40 (40P, 40G, 40S) formed in the terminal accommodating portion 33 of the housing main body 31 as shown in FIG. 4. The sub-assembly 77 is pushed while the terminal connecting portion 12 of each vehicle-side terminal 11 is inserted into the insertion hole 43 of the stopper wall 42 in the corresponding terminal accommodating chamber 40 and the lock frames 60 on the outer periphery of the retainer 50 are resiliently displaced to move onto the lock protrusions 36. When the sub-assembly 77 is fitted to a proper position where the front surface of the fitting portion 15 of each vehicle-side terminal 11 comes into contact with the stopper wall 42, the lock frames 60 are restored and displaced to be fitted to the lock protrusions 36, whereby the sub-assembly 77 is locked in a state fitted in the fitting tube portion 35. In this way, the sub-assembly 77 is integrally assembled with the housing main body 31 to form the male housing 30.

Associated with this, the terminal connecting portion 12 of the L-shaped vehicle-side terminal 11 connected to the end of each wire 20P, 20S is inserted to a proper position in the corresponding terminal accommodating chamber 40 and accommodated while being prevented from coming out backward by the retainer 50.

Along with that, in a state where each vehicle-side terminal 11 is bent at a right angle in the retainer main body 51, the wire connecting portion 13 hangs down and projects downward through the escaping recess 53A. The wire 20P, 20S drawn out from each wire connecting portion 13 is arranged along the wire holding portion 65 hanging down from the retainer 50 and held in a state wound with the tape T.

Note that, as shown in FIG. 6, a temperature sensor 75 is retained and accommodated in a sensor accommodating chamber 74 provided on the back surface of the front plate 52 of the retainer 50, and lead wires 76 drawn out from the temperature sensor 75 are arranged along the shielded wire Wa.

Subsequently, the grommet 70 is mounted on the rear surface side of the male housing 30, the cover portion 71 covers around the retainer 50 from behind and the wires 20P, 20S and 76 are inserted into the bellows-like wire inserting portion 72 and drawn out downwardly. The wire group W of those wires is connected to a battery and the like mounted in the vehicle.

After the male housing 30 is formed on the end of the wire group W and the grommet 70 is mounted on the rear surface side of the male housing 30 in this way, the male housing 30 is arranged inside the power supply port open on the body of the vehicle and the mounting portions provided on the base plate 32 of the male housing 30 are brought into contact with mounted portions 62 (not shown) provided on an opening edge part of the power supply port and fixed by being bolted. Finally, the front cover 73 is mounted on the front surface of the male housing 30, whereby the mounting of the vehicle-side connector is completed.

In the case of performing a charging operation, after a lid body provided on the power supply port is opened, the front cover 73 of the male housing 30 is removed and the female housing 3 of the charging connector 1 shown in FIG. 1 is fitted into the terminal accommodating portion 33 of the male housing 30, whereby the battery mounted in the vehicle is charged from a commercial power source.

As described above, according to this embodiment, the end parts of the respective wires 20P, 20S drawn out to the rear surface side of the retainer 50 and bent downwardly are arranged along the wire holding portion 65 formed to project downward from the retainer 50 and bundled and held in the wire holding portion 65 by being wound with the tape T. Thus, even if the wires 20P, 20S are pulled in a direction oblique to a proper drawn-out direction, the end parts thereof immediately after the vehicle-side terminals 11 are prevented from being bent and the vehicle-side terminals 11 (terminal connecting portions 12) are kept accommodated in a proper posture in the terminal accommodating chambers 40. As a result, the vehicle-side connector 10 can be precisely and smoothly connected to the mating charging connector 1 in charging.

The pair of regulating projections 58 are formed on the back end side of each locking groove 55 provided on the retainer 50 while being spaced apart by a distance shorter than the diameter of the locked groove 18 of the vehicle-side terminal 11 to be inserted. Thus, when the locked groove 18 of the vehicle-side terminal 11 is radially inserted into the corresponding locking groove 55 and pushed to the back end after passing through the regulating projections 58, the detachment of the vehicle-side terminal 11 along the locking groove 55 is suppressed.

Accordingly, a movement of each vehicle-side terminal 11 along the locking groove 55 is regulated when the vehicle-side terminal 11 (terminal connecting portion 12) is accommodated into the corresponding terminal accommodating chamber 40 via the sub-assembly 77. Thus, the inclination of the vehicle-side terminal 11 (terminal connecting portion 12) in the terminal accommodating chamber 40 is more reliably prevented. Further, that the vehicle-side terminal 11 has been pushed to a proper position (locking portion 56 as the back end of the locking groove 55) in the corresponding locking groove 55 can be confirmed by a feeling of moderation when the locked groove 18 of the vehicle-side terminal 11 is fitted to the back end of the locking groove 55 after passing through the regulating projections 58.

Next, a second embodiment of the present invention is described with reference to FIGS. 12 to 21. A vehicle-side connector 100 of the second embodiment is of a so-called 180° type in which wires are drawn out straight backward and arranged.

The following description is centered on points of difference from the vehicle-side connector 10 of the 90° type illustrated in the above embodiment. Note that parts and members having the same function as in the above first embodiment are appropriately denoted by the same reference signs and description is simplified or omitted.

The vehicle-side connector 100 includes shown five vehicle-side terminals 101, a male housing 110 for accommodating these vehicle-side terminals 101 and a retainer 130 for retaining these vehicle-side terminals 101.

The vehicle-side terminals 101 are basically formed of straight round pin terminals and composed of two male power terminals 101P, one male ground terminal 101G and two male signal terminals 101S.

Figure 18:
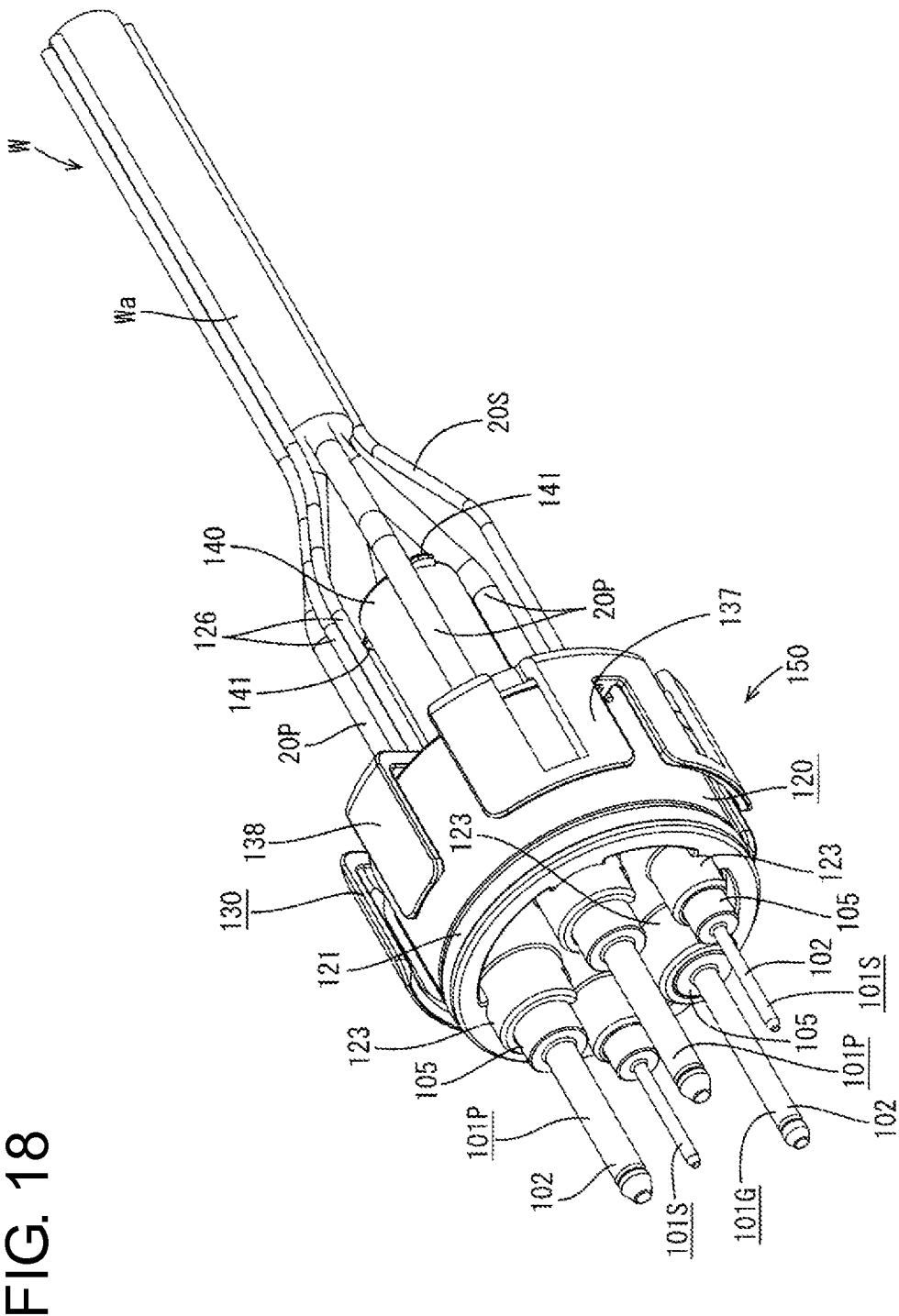
FIG. 18 is a perspective view showing a state where the retainer and a sub-housing are assembled into a sub-assembly.
Figure 19:
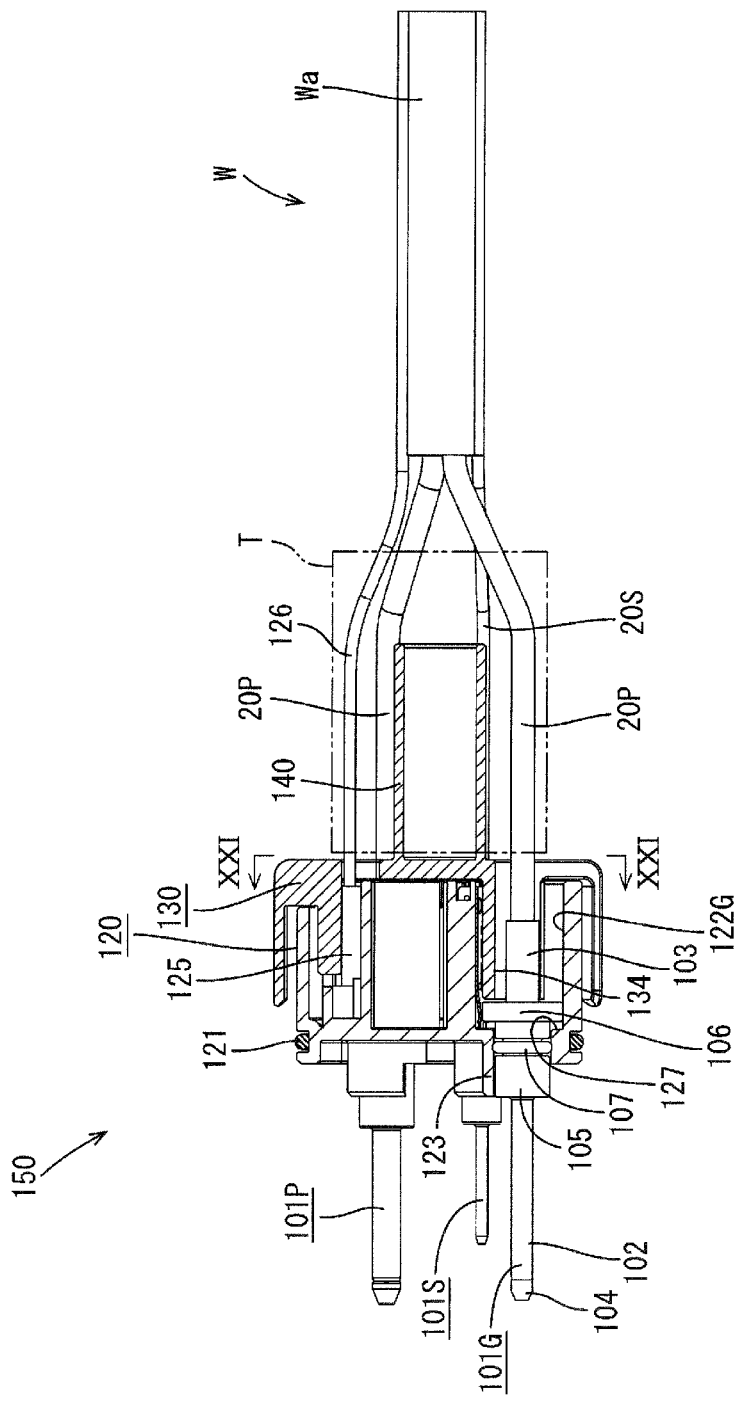
FIG. 19 is a vertical section showing the state of FIG. 18.

First, the ground terminal 101G is described. As shown in FIGS. 18 and 19, the ground terminal 101G is formed with a terminal connecting portion 102 to be connected to a mating ground terminal on a tip side and a tubular wire connecting portion 103 to be crimped to a core of a wire 20 on a rear end side. A protection cap 104 is fitted on the tip surface of the terminal connecting portion 102, and a fitting portion 105 and a flange 106 enlarged in diameter are formed on a base end side of the terminal connecting portion 102. A seal ring 107 is fitted on the outer periphery of a base end side of the fitting portion 105. The ground terminal 101G is connected to an end of a large-diameter wire 20P (thick wire 20P).

The power terminal 101P is shaped similarly to the ground terminal 101G except that a terminal connecting portion 102 is slightly thicker than that of the ground terminal 101G and the front surface of a fitting portion 105 is located more forward, and similarly connected to an end of a thick wire 20P.

Three thick wires 20P are bundled into one as an integrated shielded wire Wa (cab tire cable).

The signal terminal 101S differs from the ground terminal 101G in that it is thinner in diameter as a whole, a terminal connecting portion 102 is short and no protection cap is mounted. An end of a small-diameter wire 20S (thin wire 20S) is connected to this signal terminal 101S.

Figure 12:
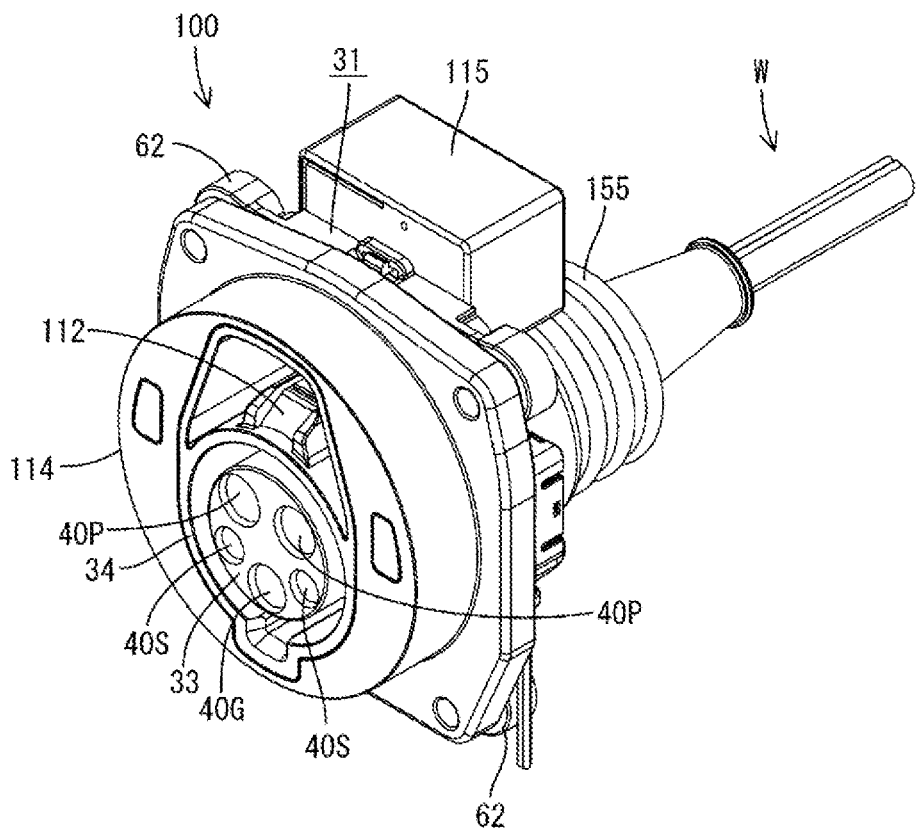
FIG. 12 is a perspective view viewed from front showing a vehicle-side connector according to a second embodiment of the present invention.
Figure 13:
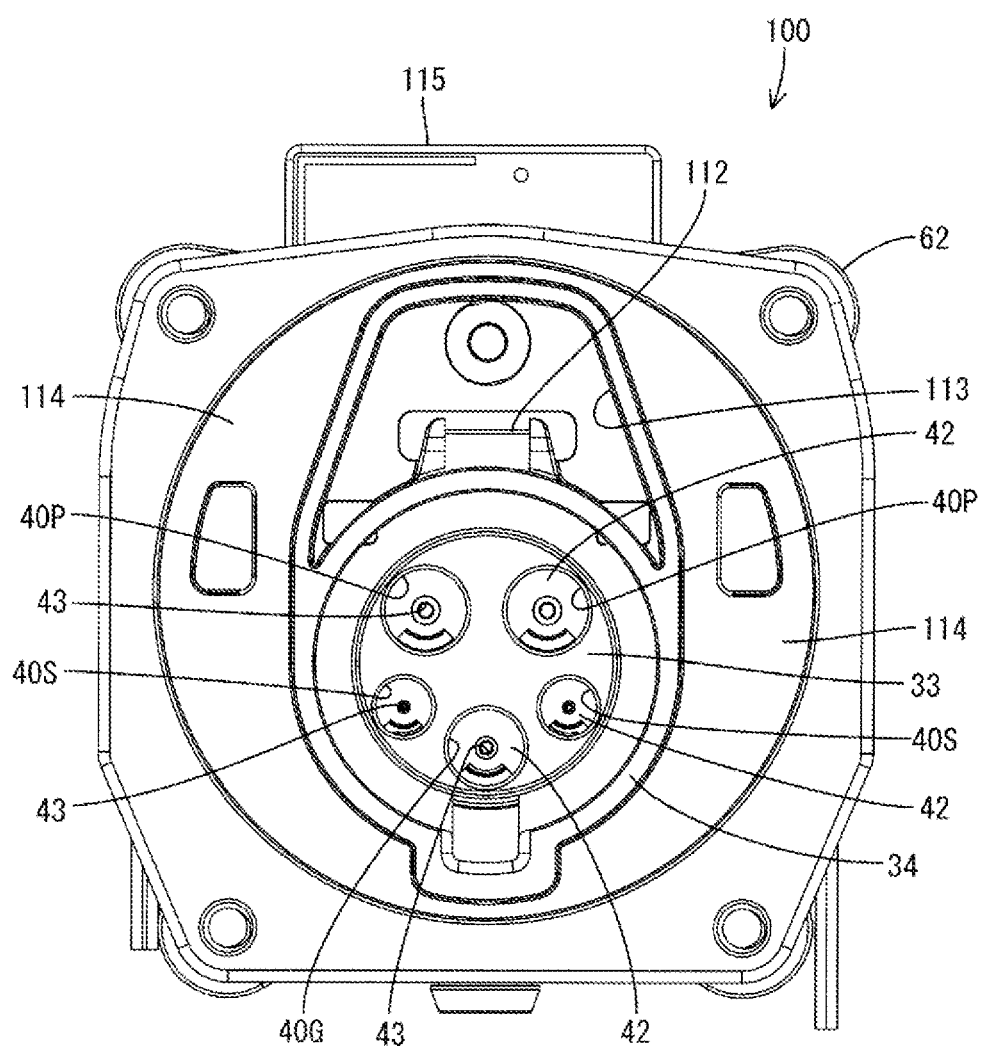
FIG. 13 is a front view of the vehicle-side connector.
Figure 15:
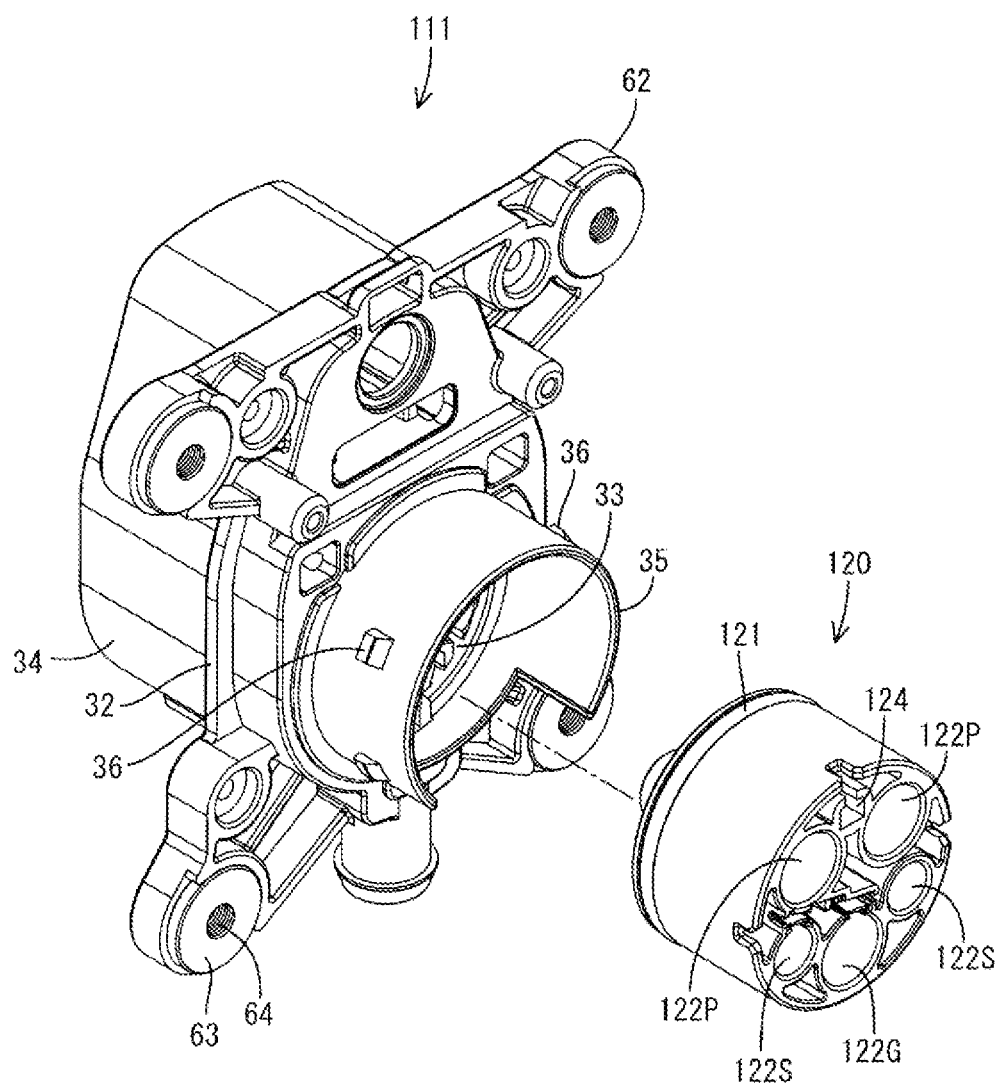
FIG. 15 is an exploded perspective view of a male housing.

The male housing 110 is made of synthetic resin and composed of two pieces, i.e. a housing main body 111 and a sub-housing 120 as shown in FIG. 15. The housing main body 111 is structured substantially similarly to the housing main body 31 of the above first embodiment. As also shown in FIGS. 12 and 13, a cylindrical terminal accommodating portion 33 is formed to project on the front surface of a base plate 32 provided with mounting portions 62 on four corners and a large receptacle 34 is formed around the terminal accommodating portion 33.

Note that a lock accommodating chamber 113 for accommodating a lock portion 112 is formed on the upper surface of the large receptacle 34 and a bezel 114 is mounted on the front surface of the base plate 32 to surround the large receptacle 34 and the lock accommodating chamber 113.

Further, an actuator 115 which functions to prevent the lock portion 112 from being erroneously unlocked is provided at an upper position of the back surface of the base plate 32.

The terminal accommodating portion 33 is formed with five terminal accommodating chambers 40 open forward and backward, wherein two terminal accommodating chambers 40P in an upper row are for the power terminals 101P, the terminal accommodating chamber 40G in the center of a lower row is for the ground terminal 101G and the terminal accommodating chambers 4S on opposite ends of the lower row are for the signal terminals 101S.

Figure 14:
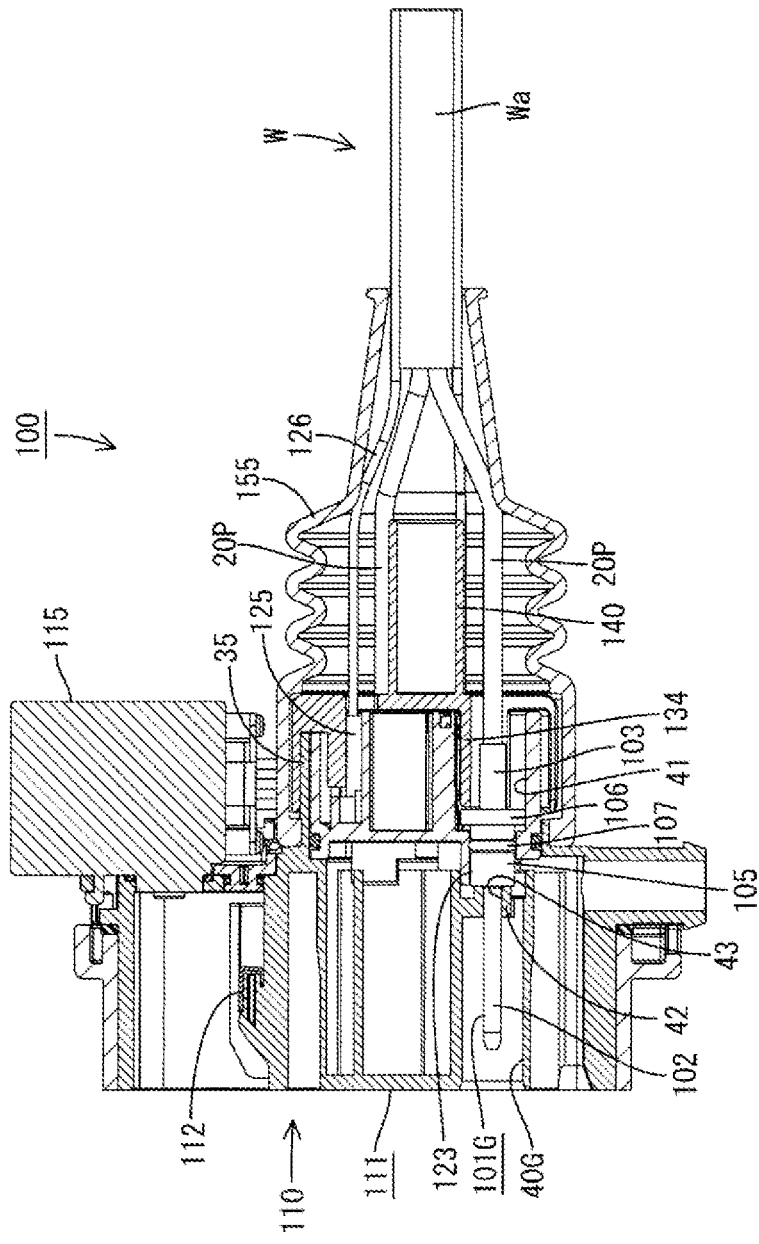
FIG. 14 is a vertical section of the vehicle-side connector.

As shown in FIG. 14, a stopper wall 42 with which the front surface of the fitting portion 105 of the corresponding vehicle-side terminal 101 is brought into contact is formed at a position of each terminal accommodating chamber 40 near the rear end and an insertion hole 43 allowing the terminal connecting portion 102 of the corresponding vehicle-side terminal 101 to be inserted therethrough is open on each stopper wall 42.

As shown in FIGS. 14 and 15, a fitting tube portion 35 is formed around the rear surface of the terminal accommodating portion 33 on the back surface of the base plate 32, and the sub-housing 120 is fittable into this fitting tube portion 35.

The sub-housing 120 is formed into a short cylindrical shape having such radial and length dimensions as to be substantially completely fitted into the fitting tube portion 35 and a seal ring 121 is fitted on the outer peripheral surface of the sub-housing 120 near the front end and can be held in close contact with the inner peripheral surface of the fitting tube portion 35 near the back end.

In the sub-housing 120, five auxiliary terminal accommodating chambers 122 (hereinafter, merely referred to as auxiliary accommodating chambers 122) open forward and backward are formed to be concentrically connected to the corresponding terminal accommodating chambers 40 provided in the terminal accommodating portion 33 described above.

The corresponding vehicle-side terminal 101 (power terminal 101P, ground terminal 101G, signal terminal 101S) is insertable into each auxiliary accommodating chamber 122P, 122G, 122S from behind and each auxiliary accommodating chamber 122P, 122G, 122S has such a diameter that the flange 106 of the vehicle-side terminal 101 is fittable. A connecting tube portion 123 reduced in diameter to be tightly fitted to the fitting portion 105 of the corresponding vehicle-side terminal 101 is connected to the front edge of each auxiliary accommodating chamber 122 and projects from the front surface of the sub-housing 120, the seal ring 121 fitted on the fitting portion 105 can be held in close contact with the inner peripheral surface of a rear end side of this connecting tube portion 123, and a front end side of the connecting tube portion 123 is fittable to a rear end part of the terminal accommodating chamber 40. Note that, as shown in FIG. 15, a sensor accommodating chamber 124 into which a temperature sensor 125 is to be inserted is formed at a position between the two auxiliary accommodating chambers 122P in the upper row on the rear surface of the inner housing 50. The temperature sensor 125 is formed into a rectangular column shape having a slightly vertically long rectangular cross-section.

The retainer 130 is provided to hold the corresponding vehicle-side terminal 101 in a state retained from each terminal accommodating chamber 40 to the auxiliary accommodating chamber 122.

Figure 16:
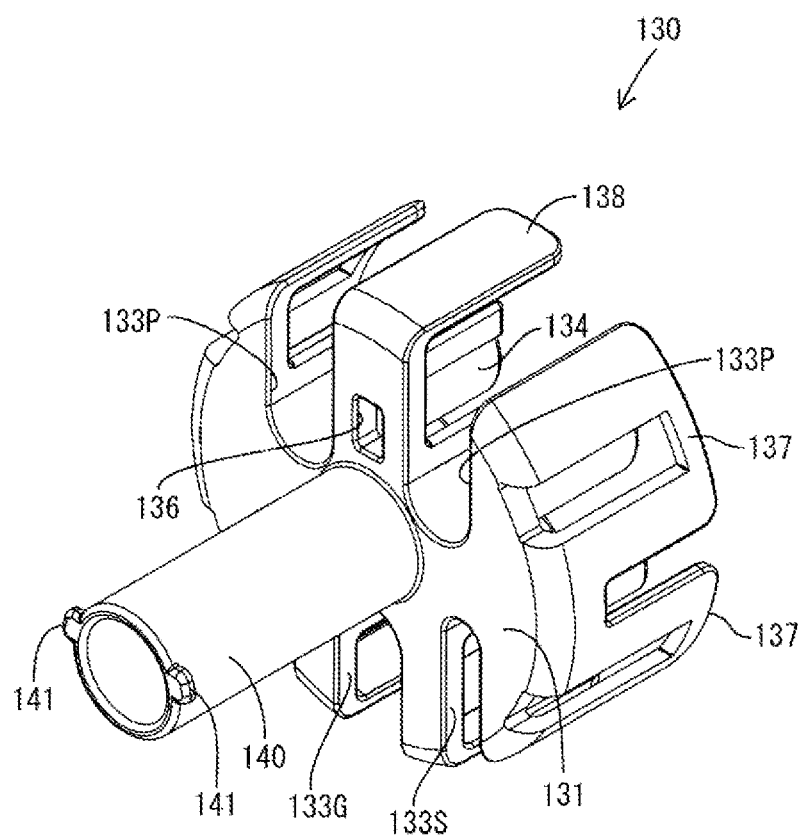
FIG. 16 is a perspective view of a retainer.
Figure 17:
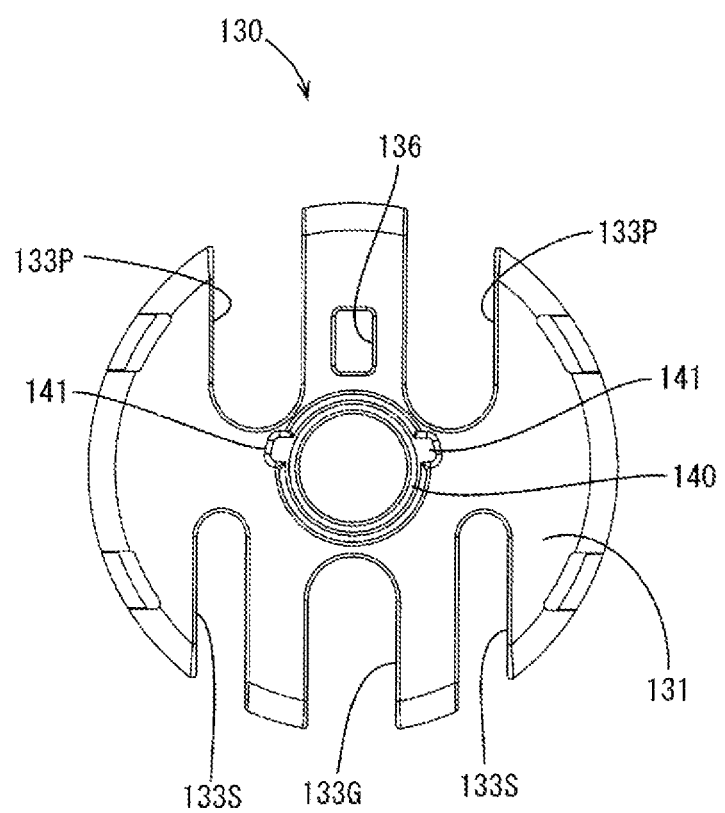
FIG. 17 is a rear view of the retainer.

The retainer 130 is made of synthetic resin and includes, as shown in FIGS. 16 and 17, a disc-like main body plate 131 to be brought into contact with the rear surface of the sub-housing 120 described above.

Five locking grooves 133 into which the wires 20P, 20S drawn out backward from the vehicle-side terminals 101 are radially insertable are formed on the main body plate 131 by cutting to be open on the peripheral edge. An edge part of the back end of each locking groove 133 is formed into a semi-circular shape and the back end is arranged concentrically with the corresponding one of the five auxiliary accommodating chambers 122.

The thick wires 20P connected to the power terminals 101P are radially inserted into two locking grooves 133P open on the upper edge out of the five locking grooves 133, and a groove width of these locking grooves 133 is slightly smaller than a diameter of the flanges 106 formed on the power terminals 101P. Gutter-like locking portions 134 having a substantially semi-circular cross-section are formed to project on peripheral edges of front surface sides on the back ends of these locking grooves 133 (see FIG. 16) and the tip edges of the locking portions 134 function to prevent the power terminals 101P from coming out backward by being locked to the flanges 106 of the power terminals 101P.

The thick wire 20P connected to the ground terminal 101G is radially insertable into the center locking groove 133G out of the three locking grooves 133 open on the lower edge, and a groove width of this locking groove 133 is slightly smaller than a diameter of the flange 106 of the ground terminal 101G. A gutter-like locking portion 134 is similarly formed to project on a peripheral edge of a front surface side on the back end of this locking groove 133 (FIG. 19) and the flange 106 of the ground terminal 101G can be locked to the tip edge of this locking portion 134.

The thin wires 20S connected to the signal terminals 101S are radially insertable into the two locking grooves 133S on the opposite ends and a groove width of these locking grooves 133S is slightly smaller than a diameter of the flanges 106 of the signal terminals 101S. Similar locking portions 134 are formed to project on peripheral edges of front surface sides on the back ends of these locking grooves 133S and the flanges 106 of the signal terminals 101S can be locked to the tip edges of the locking portions 134.

A locking hole 136 which functions as a locking portion for the temperature sensor 125 and having a slightly vertically long rectangular shape is formed at a position between the two locking grooves 133P open on the upper edge of the main body plate 131 of the retainer 130.

Two lock frames 137 which can slide in contact with the outer peripheral surface of the fitting tube portion 35 of the housing main body 101 described above are resiliently displaceably formed to project forward on each of left and right sides of the peripheral edge of the main body plate 131 in the retainer 130. Two lock frames 137 are formed while being spaced apart on each of the left and right sides, specifically between the right locking groove 133P open upward and the locking groove 133S on the right end open downward and between the left locking groove 133P open upward and the locking groove 133S on the left end open downward. Note that three clamping plates 138 capable of clamping the fitting tube portion 35 in cooperation with the outer peripheral surface of the sub-housing 120 are formed at a position between the left and right locking grooves 133P open upward and at positions between the three locking grooves 133G, 133S open downward on the peripheral edge of the main body plate 131 while likewise projecting forward.

On the other hand, on the outer peripheral surface of the fitting tube portion 35, lock protrusions 36 are formed at four positions corresponding to the respective lock frames 137 as shown in FIG. 15.

A hollow cylindrical wire holding portion 140 projects backward from a center of the back surface of the main body plate 131 of the retainer 130 as shown in FIGS. 16 and 19. The wire holding portion 140 has a length slightly longer than the lock frames 137 described above and a pair of projections 141 are bilaterally symmetrically formed at positions slightly above central height positions on left and right peripheral edges of the projecting end of the wire holding portion 140.

Next, an example of the procedure of assembling the vehicle-side connector 100 and mounting it on the body is described.

The five vehicle-side terminals 101 (power terminals 101P, ground terminal 101G, signal terminals 101S) connected to the ends of the wires 20P, 20S are mounted into the retainer 130. The wires 20P, 20S drawn out from the vehicle-side terminals 101 are respectively radially inserted into the corresponding locking grooves 133P, 133G, and 133S in the retainer 130. When the wires 20P, 20S are inserted to the back ends, the wire connecting portions 103 and the ends of the wires 20P, 20S are fitted into the locking portions 134 as shown in FIG. 19. When the respective wires 20P, 20S are subsequently pulled backward, the flanges 16 of the respective vehicle-side terminals 101 are locked to the tips of the locking portions 134 and the respective vehicle-side terminals 101 are mounted while being prevented from coming out backward.

After the five vehicle-side terminals 101 and the temperature sensor 125 are temporarily assembled with the retainer 130 while being prevented from coming out backward in this way, the retainer 130 is mounted on the rear surface of the sub-housing 120.

First, the temperature sensor 125 is pulled forward and inserted into the sensor accommodating portion 124 of the sub-housing 120. Subsequently, the terminal connecting portion 102 of each vehicle-side terminal 101 is inserted into the corresponding auxiliary accommodating chamber 122 (122P, 122G, 122S) of the sub-housing 120 from behind and, subsequently, the retainer 130 is gradually fitted while defining clearances between the lock frames 137 and the clamping plates 138 and the outer peripheral surface of the sub-housing 120.

Associated with that, each vehicle-side terminal 101 moves forward by the flange 106 being pushed by the tip of the locking portion 134 and projects forwardly of the auxiliary accommodating chamber 122. At this time, the lead wires 126 of the temperature sensor 125 are pulled backward to eliminate looseness.

When the retainer 130 is pushed until the flanges 16 of the vehicle-side terminals 101 come into contact with step portions 127 (connecting portions to the connecting tube portions 123) on the front ends of the corresponding auxiliary accommodating chambers 122, the seal rings 107 fitted on the fitting portions 105 of the respective vehicle-side terminals 101 are tightly fitted into base end sides of the corresponding connecting tube portions 123 and the sub-housing 120 and the retainer 130 are temporarily assembled (sub-assembly) on the ends of the respective wires 20P, 20S (vehicle-side terminals 101) by resulting frictional forces. Concurrently, the temperature sensor 125 accommodated in the sensor accommodating portion 124 is retained by locking the rear surface thereof to side edges of the front surface of the locking hole 136, and the lead wires 126 are pulled backward.

In other words, a sub-assembly 150 in which the sub-housing 120 and the retainer 130 are assembled in advance is formed on an end of a wire group W composed of the wires 20P, 20S and the lead wire 126 and, as shown in FIG. 18, the terminal connecting portions 102 of the five vehicle-side terminals 101 are aligned and project forward from the front surface of the sub-assembly 150 and the temperature sensor 125 is accommodated in the sub-assembly 150.

Figure 20:
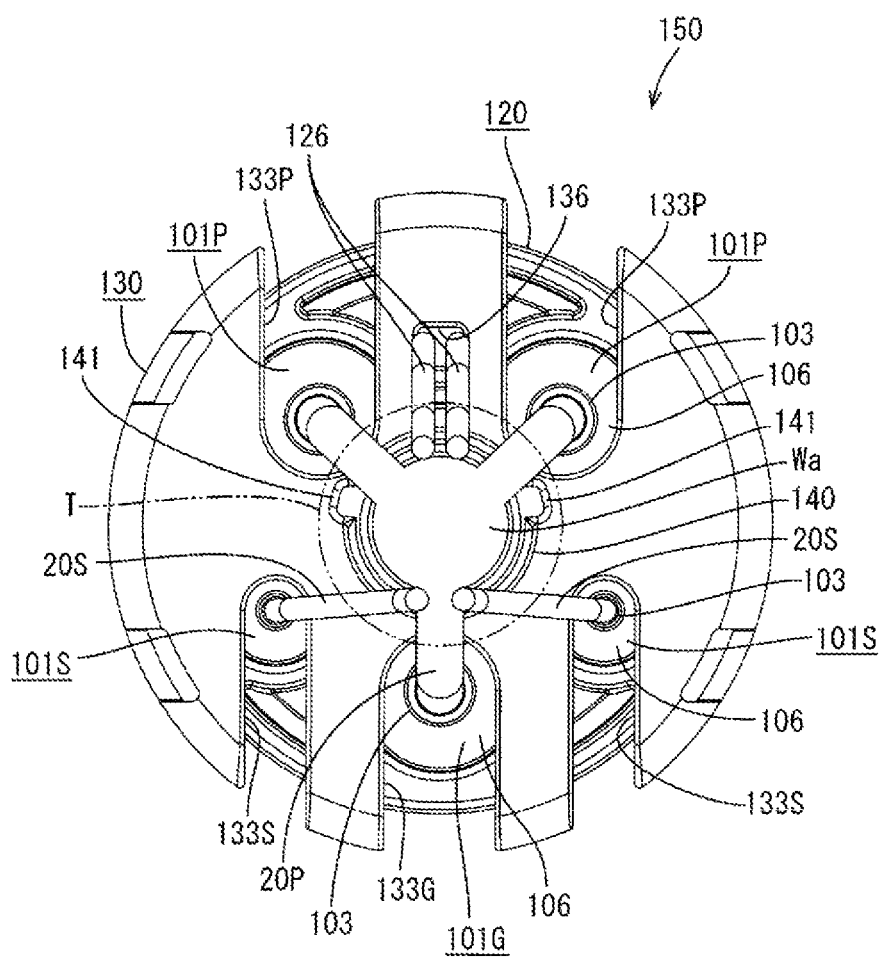
FIG. 20 is a rear view showing the state of FIG. 18.
Figure 21:
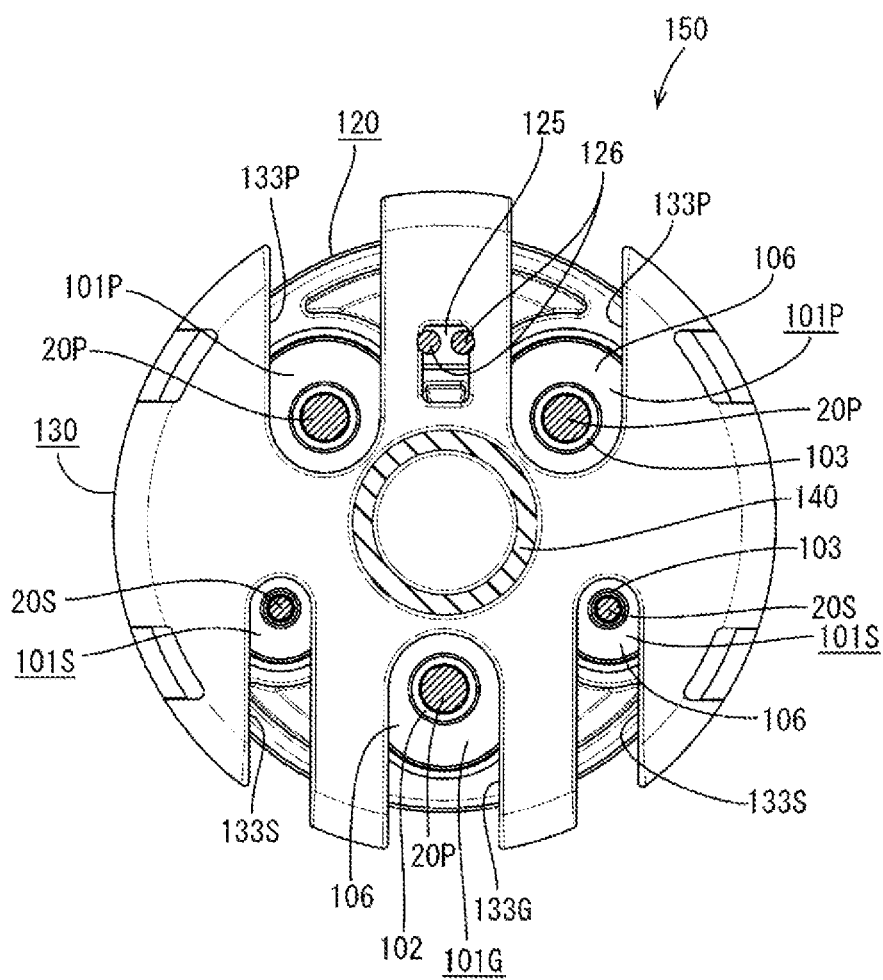
FIG. 21 is an enlarged section along XXI-XXI of FIG. 19.

Here, the wires 20P, 20S drawn out from the wire connecting portions 102 of the respective vehicle-side terminals 101 and the lead wires 126 drawn out from the temperature sensor 125 are arranged along the wire holding portion 140 formed to project backward from the main body plate 131 of the retainer 130. Specifically, as shown in FIGS. 20 and 21, the two thick wires 20P drawn out from the power terminals 101P are arranged at positions of the upper surface of the wire holding portion 140 near opposite ends while being supported on the projections 141, and the thick wire 20P drawn out from the ground terminal 101G is arranged at a widthwise center position of the lower surface of the wire holding portion 140. Further, the two thin wires 20S drawn out from the signal terminals 101S are arranged at positions at opposite sides of the thick wire 20P drawn out from the ground terminal 101G on the lower surface of the wire holding portion 140. Further, the lead wires 126 of the temperature sensor 125 are arranged at widthwise central positions of the upper surface of the wire holding portion 140.

After the wires 20P, 20S and the lead wires 126 are arranged along the outer peripheral surface of the wire holding portion 140 in this way, they are fixed by winding a tape T around them as schematically shown in FIGS. 19 and 20. Further, the lead wires 126 of the temperature sensor 125 are arranged to extend along the shielded wire Wa.

Subsequently, the sub-assembly 150 formed on the end of the wire group W is fitted into the fitting tube portion 35 from behind while the terminal connecting portion 102 of each vehicle-side terminal 101 (101P, 101G, 101S) is inserted into the corresponding terminal accommodating chamber 40 (40P, 40G, 40S) formed in the terminal accommodating portion 33 of the housing main body 111. When the sub-assembly 150 is fitted to a proper position where the fitting portion 105 of each vehicle-side terminal 101 comes into contact with the stopper wall 42 as shown in FIG. 14, the lock frames 137 are restored and displaced to be fitted to the lock protrusions 36, whereby the sub-assembly 150 is locked in a state properly fitted in the fitting tube portion 35. In this way, the sub-assembly 150 is integrally assembled with the housing main body 111 to form the male housing 110 provided with the retainer 130. Subsequently, a grommet 155 is mounted on the rear surface side of the male housing 110.

After the male housing 110 is formed on the end of the wire group W in this way and the grommet 155 is mounted on the rear surface side of the male housing 110, the male housing 110 is arranged inside a power supply port open on a body of a vehicle and the mounting portions 62 provided on the base plate 32 of the male housing 110 are placed on mounted portions (not shown) provided on an opening edge part of the power supply port and fixed by being bolted. Finally, a front cover (not shown) is mounted on the front surface of the male housing 30, whereby the mounting of the vehicle-side connector 100 is completed.

As described above, according to this embodiment, the end parts of the respective wires 20P, 20S and 126 drawn out straight backward from the rear surface of the retainer 130 are arranged along the wire holding portion 40 formed to project backward from the retainer 130 and bundled and held in the wire holding portion 140 by being wound with the tape T. Thus, particularly even if the wires 20P, 20S are pulled in a direction oblique to a proper drawn-out direction, the end parts thereof immediately after the vehicle-side terminals 101 are prevented from being bent and the vehicle-side terminals 101 (terminal connecting portions 102) are kept accommodated in a proper posture in the terminal accommodating chambers 40. As a result, the vehicle-side connector 100 can be similarly precisely and smoothly connected to the mating charging connector 1 in charging.

The present invention is not limited to the above described and illustrated embodiments. For example, the following embodiments are also included in the technical scope of the present invention.

A member such as a clip other than the tape illustrated in the above embodiments may be used as a tying member used to bundle and fix the wires arranged along the wire holding portion provided on the retainer.

Also in the vehicle-side connector of the 180° type illustrated in the second embodiment, a structure may be adopted in which a movement regulating portion (regulating projections) for the vehicle-side terminal is provided on the back end side of each locking groove of the retainer.

Conversely, in the vehicle-side connector of the 90° type illustrated in the first embodiment, the movement regulating portion (regulating projections) provided on the back end side of each locking groove of the retainer may be omitted.

Although the male housing of the vehicle-side connector is composed of two pieces, i.e. the housing main body and the sub-housing in the above embodiments, the present invention is applicable also to a male housing composed of one piece.

The present invention can be similarly applied to vehicle-side connectors of a type in which no temperature sensor is provided in a male housing.

Further, the present invention is not limitedly applied to the vehicle-side connector provided in the plug-in hybrid vehicle illustrated in the above embodiments and can be similarly applied to vehicle-side connectors provided in electric vehicles.

LIST OF REFERENCE SIGNS

1 . . . charging connector
3 . . . female housing
10 . . . vehicle-side connector
11 . . . vehicle-side terminal (terminal fitting)
11P . . . power terminal
11G . . . ground terminal
11S . . . signal terminal
12 . . . terminal connecting portion
13 . . . wire connecting portion
18 . . . locked groove (locked portion)
20, 20P, 20S . . . wire
30 . . . male housing (housing)
40, 40P, 40G, 40S . . . terminal accommodating chamber
41, 41P, 41G, 41S . . . entrance
50 . . . retainer
55, 55P, 55G, 55S . . . locking groove
56, 56P, 56G, 56S . . . locking portion
58 . . . regulating projection (movement regulating portion)
65 . . . wire holding portion 100 . . . vehicle-side connector
110 . . . male housing (housing)
101 . . . vehicle-side terminal (terminal fitting)
101P . . . power terminal
101G . . . ground terminal
101S . . . signal terminal
102 . . . terminal connecting portion
103 . . . wire connecting portion
130 . . . retainer
133, 133P, 133G, 133S . . . locking groove
140 . . . wire holding portion
T . . . tape (tying member)
W . . . wire group

The invention claimed is:
1. A vehicle-side connector to be connected to a charging connector to charge a battery mounted in a vehicle, comprising:
   a housing provided in the vehicle such that the charging connector is fittable thereinto from front;
   terminal fittings in the form of round terminals respectively connected to a plurality of wires drawn out from the interior of the vehicle including the battery;
   a plurality of terminal accommodating chambers provided in the housing and configured such that the respective terminal fittings are accommodated thereinto by being inserted from behind; and
   a retainer assemblable with a rear surface of the housing to lock and retain each terminal fittings, the retainer being formed with locking grooves into which the terminal fittings are radially insertable, the locking grooves lock and axially retain locked portions provided on the terminal fittings, a movement regulating portion narrower than a diameter of the terminal fitting is formed on a back end side of each locking groove, wherein:
   a wire holding portion capable of bundling and holding the respective wires arranged on a rear surface side of the retainer by a tying member is formed to project from the retainer;
   each wire is drawn out in a direction substantially perpendicular to an axis of the terminal accommodating chamber on the rear surface side of the housing; and
   the wire holding portion is formed to project in a radial direction substantially perpendicular to the axes of the terminal accommodating chambers from the retainer.

* * * * *